United States Patent
Morikawa et al.

(10) Patent No.: US 8,251,129 B2
(45) Date of Patent: Aug. 28, 2012

(54) REFRACTORY MATERIAL, CONTINUOUS CASTING NOZZLE USING THE REFRACTORY MATERIAL, PRODUCTION METHODS FOR THE CONTINUOUS CASTING NOZZLE, AND CONTINUOUS CASTING METHODS USING THE CONTINUOUS CASTING NOZZLE

(75) Inventors: Katsumi Morikawa, Fukuoka (JP); Akinari Sasaki, Fukuoka (JP); Hiroshi Otsuka, Fukuoka (JP); Yuichi Tsukaguchi, Osaka-fu (JP)

(73) Assignee: Krosakiharima Corporation, Fukuoka (JP)

( * ) Notice: Subject to any disclaimer, the term of this patent is extended or adjusted under 35 U.S.C. 154(b) by 159 days.

(21) Appl. No.: 12/779,277

(22) Filed: May 13, 2010

(65) Prior Publication Data
US 2011/0277951 A1 Nov. 17, 2011

(51) Int. Cl.
*B22D 11/10* (2006.01)
*B22D 41/54* (2006.01)
*C04B 35/10* (2006.01)
*C04B 35/52* (2006.01)
*B29C 43/18* (2006.01)

(52) U.S. Cl. ........ 164/488; 164/437; 222/606; 501/100; 501/101; 501/127; 264/269

(58) Field of Classification Search .................. 164/437, 164/488; 222/591, 606; 264/269; 501/100, 501/101, 127
See application file for complete search history.

(56) References Cited

U.S. PATENT DOCUMENTS

| 5,911,900 A * | 6/1999 | Muroi et al. ................. 222/606 |
| 6,637,629 B2 * | 10/2003 | Ohtsuka et al. ............... 222/606 |

FOREIGN PATENT DOCUMENTS

| JP | 1289549 A | 11/1989 |
| JP | 02023494 A | 1/1990 |
| JP | 03014540 A | 1/1991 |
| JP | 7232249 A | 9/1995 |
| JP | 10128507 A | 5/1998 |
| JP | 2001179406 A | 7/2001 |

* cited by examiner

*Primary Examiner* — Kevin P Kerns
(74) *Attorney, Agent, or Firm* — Martin Fleit; Paul D. Bianco; Fleit Gibbons Gutman Bongini & Bianco PL

(57) ABSTRACT

In an operation of continuous casting of steel grade such as aluminum-killed steel where a nozzle clogging phenomenon is particularly likely to occur, it is intended to prevent adhesion of inclusions (typically, $Al_2O_3$) on a nozzle used in the casting operation, and clogging of the nozzle due to the inclusions. A refractory material 10 is arranged to define a part or an entirety of a molten steel-contacting surface of a continuous casting nozzle, wherein the refractory material 10 contains: a CaO component in an amount of 0.5 mass % or more; one or both of $B_2O_3$ and $R_2O$ (R is one selected from the group consisting of Na, K and Li) in an amount of 0.5 mass % or more; $Al_2O_3$ in an amount of 50 mass % or more; and free carbon in an amount of 8.0 to 34.5 mass %, and wherein a total amount of CaO, $B_2O_3$ and $R_2O$ is in the range of 1.0 to 15.0 mass %, and a mass ratio of $CaO/(B_2O_3+R_2O)$ is in the range of 0.1 to 3.0.

20 Claims, 12 Drawing Sheets

Fig.1
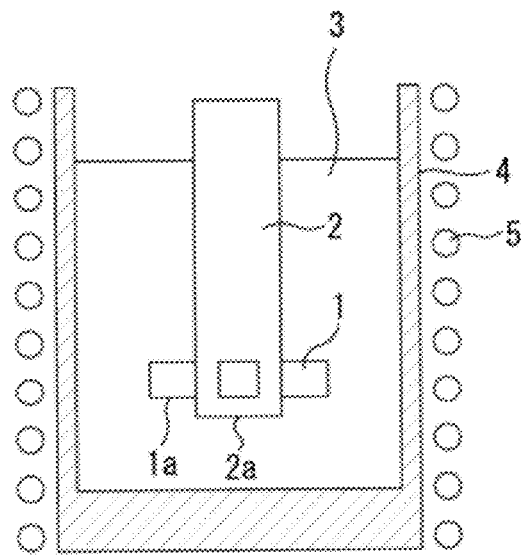
Fig.2
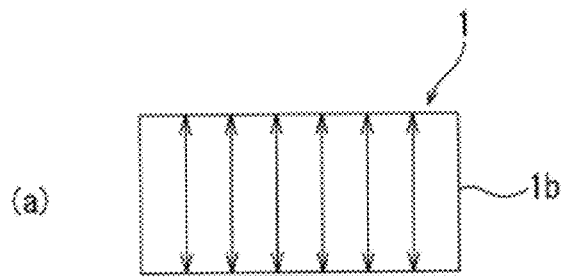
(a)
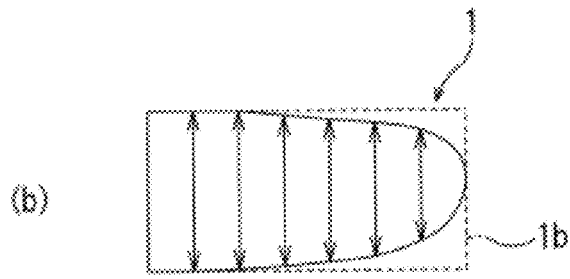
(b)

(A) Comparative sample 1
Maximum adhesion speed: 42 μm/min (B) Inventive sample 17
Maximum adhesion speed: 3 μm/min

TABLE 1

| | Comparative Example 1 | Comparative Example 2 | Comparative Example 3 | Comparative Example 4 | Comparative Example 5 | Inventive Example 1 | Inventive Example 2 | Inventive Example 3 | Inventive Example 4 | Inventive Example 5 | Inventive Example 6 | Inventive Example 7 | Inventive Example 8 | Inventive Example 9 | Inventive Example 10 |
|---|---|---|---|---|---|---|---|---|---|---|---|---|---|---|---|
| Refractory raw material mixture (mass%) | | | | | | | | | | | | | | | |
| flaky graphite 500 μm or less | 20 | 20 | 20 | 20 | 20 | 20 | 20 | 20 | 20 | 20 | 20 | 20 | 20 | 20 | 20 |
| fused alumina greater than 0.2 mm to 0.5 mm | 40 | 40 | 40 | 40 | 40 | 40 | 40 | 40 | 40 | 40 | 40 | 40 | 40 | 40 | 40 |
| fused alumina greater than 0.1 mm to 0.2 mm | 20 | 20 | 20 | 20 | 20 | 20 | 20 | 20 | 20 | 20 | 20 | 20 | 20 | 20 | 20 |
| fused alumina 0.1 mm or less | 14 | 14 | 14 | 14 | 14 | 14 | 14 | 14 | 14 | 14 | 14 | 14 | 14 | 14 | 14 |
| zirconia fine powder | 3 | 3 | 3 | 3 | 3 | 3 | 3 | 3 | 3 | 3 | 3 | 3 | 3 | 3 | 3 |
| fused MgO 0.5 to 0 mm | | | | | | | | | | | | | | | |
| silica fine powder 0.3 mm or less | 3 | 3 | 3 | 3 | 3 | 3 | 3 | 3 | 3 | 3 | 3 | 3 | 3 | 3 | 3 |
| * Phenol resin (as fixed carbon) | 3.8 | 3.8 | 3.8 | 3.8 | 3.8 | 3.8 | 3.8 | 3.8 | 3.8 | 3.8 | 3.8 | 3.8 | 3.8 | 3.8 | 3.8 |
| * Anhydrous boric acid powder (< 0.21 mm) | | | | 0.8 | 0.8 | 0.5 | | 0.5 | 0.5 | 0.5 | 3.0 | 3.0 | 3.0 | 3.0 | 10.0 |
| * Calcium carbonate (< 0.21 mm) | | 6.0 | | 0.8 | | 1.0 | 1.0 | 1.0 | 1.0 | 1.0 | 1.7 | | 1.1 | | 5.0 |
| * Anhydrous borax powder (< 0.21 mm) | | | 3.3 | | 0.4 | | | | | | | | | | |
| * Anhydrous potassium carbonate (< 0.21 mm) | | | | | | | | 0.8 | 0.9 | 1.2 | | 2.8 | | 4.2 | |
| * Anhydrous sodium carbonate (< 0.21 mm) | | | | | 0.7 | | 0.9 | | | | | | | | |
| * Anhydrous lithium carbonate (< 0.21 mm) | | | | | | | | | | | | | | | 2.1 |
| Chemical component (mass%) Al$_2$O$_3$ | 71.1 | 68.8 | 68.9 | 70.2 | 70.5 | 70.3 | 70.3 | 70.0 | 70.0 | 70.0 | 68.8 | 68.9 | 68.9 | 67.2 | 64.5 |
| SiO$_2$ | 2.9 | 2.3 | 2.8 | 2.9 | 2.9 | 2.9 | 2.9 | 2.9 | 2.9 | 2.9 | 2.8 | 2.8 | 2.8 | 2.7 | 2.6 |
| CaO | | 3.1 | | 0.4 | 0.4 | 0.5 | 0.5 | 0.5 | 0.5 | 0.5 | 1.6 | 1.6 | 1.6 | 1.5 | 5.0 |
| K$_2$O | | | | | | | | 0.5 | 0.5 | 0.5 | | 1.5 | | | |
| Na$_2$O | | | | | 0.4 | | 0.5 | | | | | | 1.5 | | |
| Li$_2$O | | | | | | | | | | | | | | 1.6 | 2.3 |
| B$_2$O$_3$ | | | 1.5 | 0.4 | | 0.5 | | | 0.5 | 0.5 | 0.7 | | | | |
| ZrO$_2$ | 2.8 | 2.7 | 2.7 | 2.8 | 2.8 | 2.8 | 2.8 | 2.8 | 2.8 | 2.8 | 2.7 | 2.7 | 2.7 | 2.7 | 2.6 |
| MgO | | | | | | | | | | | 0.8 | | | | |
| C (free Carbon) | 22.7 | 22.0 | 22.0 | 22.4 | 22.5 | 22.5 | 22.5 | 22.4 | 22.4 | 22.4 | 22.0 | 22.0 | 22.2 | 21.5 | 20.6 |
| others (impurities, etc.) | 0.5 | 0.6 | 0.5 | 0.9 | 0.5 | 0.5 | 0.4 | 0.4 | 0.4 | 0.4 | 0.6 | 0.5 | 0.3 | 2.8 | 0.3 |
| Total amount α$^2$ (CaO, B$_2$O$_3$ and R$_2$O) R = Na, K | 0.0 | 3.1 | 1.5 | 0.8 | 1.0 | 1.0 | 1.0 | 1.5 | 1.5 | 1.5 | 3.1 | 3.1 | 3.1 | 3.1 | 9.4 |
| Mass ratio of CaO / (B$_2$O$_3$ + R$_2$O) | — | 0.80 | 0.75 | 2.30 | 0.80 | 1.50 | 0.80 | 1.50 | 0.80 | 2.20 | 1.1 | 0.60 | 0.90 | 1.00 | 0.42 |
| Permeability of refractory material × 10$^{-3}$ (cm$^2$/cm H$_2$O) | 2.50 | 0.80 | 0.15 | <0.1 | <0.1 | 0.11 | 0.18 | 0.25 | 0.22 | 0.20 | 0.25 | 0.26 | 0.28 | 0.22 | 0.55 |
| Thickness of slag-based covering layer on working surface of test sample after in-molten steel rotation test (mm) | <0.1 | — | 0.0 | 1.0 | 1.0 | C | C | C | C | C | B | B | B | B | A |
| Coverage of slag based covering layer with respect to working surface of test sample after in-molten steel rotation test A: > 90% (excellent), B: 71 to 90% (good), C: 50 to 70 (allowable), D: <50 (defective) | D | D | D | D | D | C | C | C | C | C | B | B | B | B | A |
| Wear/adhesion speed in in-molten steel rotation test (+) indicates adhesion, and (−) indicates wear Evaluation A (excellent): ≤ ± a, B (good): ≤ ± b C (allowable): ≤ ± 30 μm/min, D (defective): > ± | D(+) | D(+) | D(+) | D(+) | D(−) | C(+) | C(+) | C(+) | B(+) | C(+) | B(+) | B(+) | B(+) | B(+) | A(+) |

* mass% to be added to 100 mass% of the refractory raw material mixture

TABLE 2

| | Comparative Example 6 | Inventive Example 11 | Inventive Example 12 | Inventive Example 6 |
|---|---|---|---|---|
| Refractory raw material mixture (mass%) | | | | |
| flaky graphite 500 μm or less | 20 | 20 | 20 | 20 |
| fused alumina greater than 0.2 mm to 0.5 mm | 17 | 20 | 30 | 40 |
| fused alumina greater than 0.1 mm to 0.2 mm | 20 | 20 | 20 | 20 |
| fused alumina 0.1 mm or less | 14 | 14 | 14 | 14 |
| zirconia fine powder | 3 | 3 | 3 | 3 |
| fused MgO 0.5 to 0 mm | 23 | 20 | 10 | 0 |
| silica fine powder 0.3 mm or less | 3 | 3 | 3 | 3 |
| * Phenol resin (as fixed carbon) | 3.8 | 3.8 | 3.8 | 3.8 |
| * Anhydrous boric acid powder (< 0.21 mm) | | | | |
| * Calcium carbonate (< 0.21 mm) | 3.0 | 3.0 | 3.0 | 3.0 |
| * Anhydrous borax powder (< 0.21 mm) | 1.7 | 1.7 | 1.7 | 1.7 |
| * Anhydrous potassium carbonate (< 0.21 mm) | | | | |
| * Anhydrous sodium carbonate (< 0.21 mm) | | | | |
| * Anhydrous lithium carbonate (< 0.21 mm) | | | | |
| Chemical component (mass%) $Al_2O_3$ | 47.4 | 50.2 | 59.5 | 68.8 |
| $SiO_2$ | 2.8 | 2.8 | 2.8 | 2.8 |
| CaO | 1.7 | 1.7 | 1.6 | 1.6 |
| $K_2O$ | | | | |
| $Na_2O$ | 0.7 | 0.7 | 0.7 | 0.7 |
| $Li_2O$ | | | | |
| $B_2O_3$ | 0.8 | 0.8 | 0.8 | 0.8 |
| $ZrO_2$ | 2.7 | 2.7 | 2.7 | 2.7 |
| MgO | 21.2 | 18.5 | 9.2 | |
| C (Free Carbon) | 22.0 | 22.0 | 22.0 | 22.0 |
| others (impurities, etc.) | 0.7 | 0.6 | 0.7 | 0.6 |
| Total amount of (CaO, $B_2O_3$ and $R_2O$) R = Na, K, | 3.2 | 3.2 | 3.1 | 3.1 |
| Mass ratio of CaO / ($B_2O_3$ + $R_2O$) | 1.1 | 1.1 | 1.1 | 1.1 |
| Permeability of refractory material × $10^{-3}$ ($cm^2$ / cm $H_2O$) | 0.55 | 0.60 | 0.60 | 0.69 |
| Thickness of slag-based covering layer on working surface of test sample after in-molten steel rotation test (mm) | 0.05 | 0.10 | 0.15 | 0.25 |
| Coverage of slag-based covering layer with respect to working surface of test sample after in-molten steel A: > 90% (excellent), B: 71 to 90% (good), C: 50 to 70 (allowable), D: < 50 (defective) | D | C | C | B |
| Wear/adhesion speed in in-molten steel rotation test (+) indicates adhesion, and (−) indicates wear Evaluation A (excellent): ≤ ± 5 μm/min, B (good): ≤ ± C (allowable): ≤ ± 30 μm/min, D (defective): > ± | D(+) | C(+) | C(+) | B(+) |

\* mass% to be added to 100 mass% of the refractory raw material mixture

FIG. 9

TABLE 3

| | Comparative Example 7 | Inventive Example 13 | Inventive Example 6 | Inventive Example 14 | Comparative Example 8 |
|---|---|---|---|---|---|
| Refractory raw material mixture (mass%) | | | | | |
| flaky graphite 500 μm or less | 4 | 5 | 20 | 35.5 | 36.5 |
| fused alumina greater than 0.2 mm to 0.5 mm | 56 | 55 | 40 | 30.5 | 29.5 |
| fused alumina greater than 0.1 mm to 0.2 mm | 20 | 20 | 20 | 20 | 20 |
| fused alumina 0.1 mm or less | 14 | 14 | 14 | 14 | 14 |
| zirconia fine powder | 3 | 3 | 3 | 3 | 3 |
| fused MgO 0.5 to 0 mm | 0 | 0 | 0 | 0 | 0 |
| silica fine powder 0.3 mm or less | 3 | 3 | 3 | 3 | 3 |
| * Phenol resin (as fixed carbon) | 3.8 | 3.8 | 3.8 | 3.8 | 3.8 |
| * Anhydrous boric acid powder (< 0.21 mm) | | | | | |
| * Calcium carbonate (< 0.21 mm) | 3.0 | 3.0 | 3.0 | 3.0 | 3.0 |
| * Anhydrous borax powder (< 0.21 mm) | 1.7 | 1.7 | 1.7 | 1.7 | 1.7 |
| * Anhydrous potassium carbonate (< 0.21 mm) | | | | | |
| * Anhydrous sodium carbonate (< 0.21 mm) | | | | | |
| * Anhydrous lithium carbonate (< 0.21 mm) | | | | | |
| Chemical component (mass%) $Al_2O_3$ | 83.7 | 82.8 | 68.8 | 56.6 | 55.9 |
| $SiO_2$ | 2.8 | 2.8 | 2.8 | 2.7 | 2.7 |
| CaO | 1.6 | 1.6 | 1.6 | 1.6 | 1.6 |
| $K_2O$ | | | | | |
| $Na_2O$ | 0.7 | 0.7 | 0.7 | 0.7 | 0.7 |
| $Li_2O$ | | | | | |
| $B_2O_3$ | 0.8 | 0.8 | 0.8 | 0.8 | 0.8 |
| $ZrO_2$ | 2.7 | 2.7 | 2.7 | 2.7 | 2.7 |
| MgO | | | | | |
| C (Free Carbon) | 7.3 | 8.2 | 22.0 | 34.5 | 35.2 |
| others (impurities, etc.) | 0.4 | 0.4 | 0.6 | 0.4 | 0.4 |
| Total amount of (CaO, $B_2O_3$ and $R_2O$) R = Na, K, | 3.1 | 3.1 | 3.1 | 3.1 | 3.1 |
| Mass ratio of CaO / ($B_2O_3$ + $R_2O$) | 1.1 | 1.1 | 1.1 | 1.1 | 1.1 |
| Permeability of refractory material × $10^{-3}$ ($cm^2$ / cm $H_2O$) | 2.00 | 1.50 | 0.69 | 0.40 | 0.30 |
| Thickness of slag-based covering layer on working surface of test sample after in-molten steel rotation test (mm) | 0.08 | 0.13 | 0.25 | 0.28 | 0.2 |
| Coverage of slag-based covering layer with respect to working surface of test sample after in-molten steel A: > 90% (excellent), B: 71 to 90% (good), C: 50 to 70 (allowable), D: < 50 (defective) | D | C | B | C | D |
| Wear/adhesion speed in in-molten steel rotation test (+) indicates adhesion, and (−) indicates wear Evaluation A (excellent): ≤ ± 5 μm/min, B (good): ≤ ± 15 μm/min  C (allowable): ≤ ± 30 μm/min, D (defective): > ± 30 μm/min | D(+) | C(+) | B(+) | C(−) | D(−) |

\* mass% to be added to 100 mass% of the refractory raw material mixture

FIG. 10

TABLE 4

| | Comparative Example 1 | Inventive Example 15 | Inventive Example 16 | Inventive Example 6 | Inventive Example 17 | Inventive Example 18 | Comparative Example 9 |
|---|---|---|---|---|---|---|---|
| Refractory raw material mixture (mass%) | | | | | | | |
| flaky graphite 500 μm or less | 20 | 20 | 20 | 20 | 20 | 20 | 20 |
| fused alumina greater than 0.2 mm to 0.5 mm | 40 | 40 | 40 | 40 | 40 | 40 | 40 |
| fused alumina greater than 0.1 mm to 0.2 mm | 20 | 20 | 20 | 20 | 20 | 20 | 20 |
| fused alumina 0.1 mm or less | 14 | 14 | 14 | 14 | 14 | 14 | 14 |
| zirconia fine powder | 3 | 3 | 3 | 3 | 3 | 3 | 3 |
| fused MgO 0.5 to 0 mm | | | | 0 | | | |
| silica fine powder 0.3 mm or less | 3 | 3 | 3 | 3 | 3 | 3 | 3 |
| * Phenol resin (as fixed carbon) | 3.8 | 3.8 | 3.8 | 3.8 | 3.8 | 3.8 | 3.8 |
| * Anhydrous boric acid powder (< 0.21 mm) | | | | | | | |
| * Calcium carbonate (< 0.21 mm) | | 1.0 | 2.0 | 3.0 | 10.9 | 16.7 | 18.0 |
| * Anhydrous borax powder (< 0.21 mm) | | 0.5 | 1.1 | 1.7 | 5.4 | 9.0 | 9.7 |
| * Anhydrous potassium carbonate (< 0.21 mm) | | | | | | | |
| * Anhydrous sodium carbonate (< 0.21 mm) | | | | | | | |
| * Anhydrous lithium carbonate (< 0.21 mm) | | | | | | | |
| Chemical component (mass%) $Al_2O_3$ | 71.1 | 70.4 | 69.6 | 68.8 | 63.9 | 60.4 | 59.7 |
| $SiO_2$ | 2.9 | 2.9 | 2.8 | 2.8 | 2.6 | 2.5 | 2.4 |
| CaO | | 0.5 | 1.1 | 1.6 | 5.3 | 7.7 | 8.2 |
| $K_2O$ | | | | | | | |
| $Na_2O$ | | 0.2 | 0.5 | 0.7 | 2.2 | 3.5 | 3.7 |
| $Li_2O$ | | | | | | | |
| $B_2O_3$ | | 0.3 | 0.6 | 0.8 | 2.5 | 3.9 | 4.1 |
| $ZrO_2$ | 2.8 | 2.8 | 2.8 | 2.7 | 2.5 | 2.4 | 2.4 |
| MgO | | | | | | | |
| C (Free Carbon) | 22.7 | 22.5 | 22.2 | 22.0 | 20.4 | 19.3 | 19.1 |
| others (impurities, etc.) | 0.5 | 0.4 | 0.5 | 0.6 | 0.6 | 0.4 | 0.4 |
| Total amount of (CaO, $B_2O_3$ and $R_2O$) R = Na, K, | | 1.0 | 2.1 | 3.1 | 10.0 | 15.0 | 16.0 |
| Mass ratio of CaO / ($B_2O_3$ + $R_2O$) | 0.0 | 1.0 | 1.1 | 1.1 | 1.1 | 1.1 | 1.1 |
| Permeability of refractory material × $10^{-3}$ ($cm^2$ / cm $H_2O$) | 2.5 | 0.90 | 0.74 | 0.69 | 0.52 | 0.42 | 0.35 |
| Thickness of slag based covering layer on working surface of test sample after in-molten steel rotation test (mm) | <0.1 | 0.10 | 0.15 | 0.25 | 0.76 | 0.71 | 0.40 |
| Coverage of slag-based covering layer with respect to working surface of test sample after in-molten steel A: > 90% (excellent), B: 71 to 90% (good), C: 50 to 70 (allowable), D: < 50 (defective) | D | C | C | B | A | B | C |
| Wear/adhesion speed in in molten steel rotation test (+) indicates adhesion, and (−) indicates wear Evaluation A (excellent): ≤ ± 5 μm/min, B (good): ≤ ± C (allowable): ≤ − 30 μm/min, D (defective): > + | D(+) | C(+) | C(+) | B(+) | A(+) | B(−) | C(−) |

* mass% to be added to 100 mass% of the refractory raw material mixture

FIG. 11

TABLE 5

| | Comparative Example 1 | Inventive Example 19 | Inventive Example 20 | Inventive Example 21 | Inventive Example 22 | Inventive Example 17 | Inventive Example 23 | Comparative Example 10 |
|---|---|---|---|---|---|---|---|---|
| Refractory raw material mixture (mass%) | | | | | | | | |
| flaky graphite 500 μm or less | 20 | 20 | 20 | 20 | 20 | 20 | 20 | 20 |
| fused alumina greater than 0.2 mm to 0.5 mm | 40 | 40 | 40 | 40 | 40 | 40 | 40 | 40 |
| fused alumina greater than 0.1 mm to 0.2 mm | 20 | 20 | 20 | 20 | 20 | 20 | 20 | 20 |
| fused alumina 0.1 mm or less | 14 | 14 | 14 | 14 | 14 | 14 | 14 | 14 |
| zirconia fine powder | 3 | 3 | 3 | 3 | 3 | 3 | 3 | 3 |
| fused MgO 0.5 to 0 mm | | | | | | | | |
| silica fine powder 0.3 mm or less | 3 | 3 | 3 | 3 | 3 | 3 | 3 | 3 |
| * Phenol resin (as fixed carbon) | 3.8 | 3.8 | 3.8 | 3.8 | 3.8 | 3.8 | 3.8 | 3.8 |
| * Anhydrous boric acid powder (< 0.21 mm) | | | | 7.8 | | | | |
| * Calcium carbonate (< 0.21 mm) | | 1.5 | 6.6 | 6.6 | 7.8 | 10.9 | 15.5 | 15.8 |
| * Anhydrous borax powder (< 0.21 mm) | | 10.7 | | | 7.2 | 5.4 | 2.8 | 2.8 |
| * Anhydrous potassium carbonate (< 0.21 mm) | | | | | | | | |
| * Anhydrous sodium carbonate (< 0.21 mm) | | | 13.5 | | | | | |
| * Anhydrous lithium carbonate (< 0.21 mm) | | | | | | | | |
| Chemical component (mass%) $Al_2O_3$ | 71.1 | 64.0 | 63.9 | 64.0 | 63.9 | 63.9 | 63.9 | 63.9 |
| $SiO_2$ | 2.9 | 2.6 | 2.6 | 2.6 | 2.6 | 2.6 | 2.6 | 2.6 |
| CaO | | 0.7 | 3.2 | 3.2 | 3.8 | 5.3 | 7.1 | 7.7 |
| $K_2O$ | | | | | | | | |
| $Na_2O$ | | 4.4 | 6.8 | | 2.9 | 2.2 | 1.2 | 1.1 |
| $Li_2O$ | | | | | | | | |
| $B_2O_3$ | | 4.9 | | 6.8 | 3.3 | 2.5 | 1.3 | 1.3 |
| $ZrO_2$ | 2.8 | 2.5 | 2.5 | 2.5 | 2.5 | 2.5 | 2.5 | 2.5 |
| MgO | | | | | | | | |
| C (Free Carbon) | 22.7 | 20.4 | 20.4 | 20.4 | 20.4 | 20.4 | 20.4 | 20.4 |
| others (impurities, etc.) | 0.5 | 0.6 | 0.6 | 0.5 | 0.6 | 0.6 | 0.6 | 0.6 |
| Total amount of (CaO, $B_2O_3$ and $R_2O$) R = Na, K | | 10.0 | 10.0 | 10.0 | 10.0 | 10.0 | 10.0 | 10.0 |
| Mass ratio of CaO / ($B_2O_3$ + $R_2O$) | 0.0 | 0.1 | 0.5 | 0.5 | 0.6 | 1.1 | 3.0 | 3.2 |
| Permeability of refractory material × $10^{-3}$ ($cm^2$ / cm $H_2O$) | 2.5 | 0.42 | 0.40 | 0.80 | 0.49 | 0.52 | 0.65 | 0.7 |
| Thickness of slag-based covering layer on working surface of test sample after in-molten steel rotation test (mm) | <0.1 | 0.11 | 0.12 | 0.20 | 0.55 | 0.76 | 0.60 | 0.4 |
| Coverage of slag-based covering layer with respect to working surface of test sample after in molten steel A: > 90% (excellent), B: 71 to 90% (good), C: 50 to 70 (allowable), D: < 50 (defective) | D | C | C | B | B | A | B | C |
| Wear/adhesion speed in in-molten steel rotation test (+) indicates adhesion, and (-) indicates wear Evaluation A (excellent): ≤ ± 5 μm/min, B (good): ≤ ± C (allowable): ≤ ± 30 μm/min, D (defective): > ± | D(+) | C(-) | C(+) | B(+) | B(-) | A(+) | B(-) | C(-) |

* mass% to be added to 100 mass% of the refractory raw material mixture

FIG. 12

TABLE 6

| | Inventive Example 24 | Inventive Example 25 | Inventive Example 6 | Inventive Example 26 | Inventive Example 27 | Inventive Example 28 |
|---|---|---|---|---|---|---|
| Refractory raw material mixture (mass%) | | | | | | |
| flaky graphite 500 μm or less | 20 | 20 | 20 | 20 | 20 | 20 |
| fused alumina greater than 0.2 mm to 0.5 mm | 40 | 40 | 40 | 40 | 40 | 40 |
| fused alumina greater than 0.1 mm to 0.2 mm | 20 | 20 | 20 | 20 | 20 | 20 |
| fused alumina 0.1 mm or less | 14 | 14 | 14 | 14 | 14 | 14 |
| zirconia fine powder | 3 | 3 | 3 | 3 | 3 | 3 |
| fused MgO 0.5 to 0 mm | | | | | | |
| silica fine powder 0.3 mm or less | 3 | 3 | 3 | 3 | 3 | 3 |
| * Phenol resin (as fixed carbon) | 3.8 | 3.8 | 3.8 | 3.8 | 3.8 | 3.8 |
| * Anhydrous boric acid powder (< 0.21 mm) | | | | | | |
| * Calcium carbonate (< 0.21 mm) | 3.0 | 3.0 | 3.0 | 3.0 | 3.0 | 3.0 |
| * Anhydrous borax powder (< 0.21 mm) | 1.6 | 1.6 | 1.7 | 1.6 | 1.6 | 1.6 |
| * Anhydrous potassium carbonate (< 0.21 mm) | | | | | | |
| * Anhydrous sodium carbonate (< 0.21 mm) | | | | | | |
| * Anhydrous lithium carbonate (< 0.21 mm) | | | | | | |
| Chemical component (mass%) $Al_2O_3$ | 68.8 | 68.8 | 68.8 | 68.8 | 68.8 | 68.8 |
| $SiO_2$ | 2.8 | 2.8 | 2.8 | 2.8 | 2.8 | 2.8 |
| CaO | 1.6 | 1.6 | 1.6 | 1.6 | 1.6 | 1.6 |
| $K_2O$ | | | | | | |
| $Na_2O$ | 0.7 | 0.7 | 0.7 | 0.7 | 0.7 | 0.7 |
| $Li_2O$ | | | | | | |
| $B_2O_3$ | 0.8 | 0.8 | 0.8 | 0.8 | 0.8 | 0.8 |
| $ZrO_2$ | 2.7 | 2.7 | 2.7 | 2.7 | 2.7 | 2.7 |
| MgO | | | | | | |
| C (Free Carbon) | 22.0 | 22.0 | 22.0 | 22.0 | 22.0 | 22.0 |
| others (impurities, etc.) | 0.6 | 0.6 | 0.6 | 0.6 | 0.6 | 0.6 |
| Total amount of (CaO, $B_2O_3$ and $R_2O$) R = Na, K, | 3.1 | 3.1 | 3.1 | 3.1 | 3.1 | 3.1 |
| Mass ratio of CaO / ($B_2O_3$ + $R_2O$) | 1.1 | 1.1 | 1.1 | 1.1 | 1.1 | 1.1 |
| Shaping pressure for test sample (index on the basis of 100 for Inventive Example 6) | 200 | 150 | 100 | 75 | 35 | 20 |
| Permeability of refractory material × $10^{-3}$ ($cm^2$ / cm $H_2O$) | 0.3 | 0.4 | 0.7 | 2.2 | 4.0 | 4.4 |
| Thickness of slag-based covering layer on working surface of test sample after in-molten steel rotation test (mm) | 0.10 | 0.18 | 0.25 | 0.40 | 0.95 | 1.10 |
| Coverage of slag-based covering layer with respect to working surface of test sample after in-molten steel A: > 90% (excellent), B: 71 to 90% (good), C: 50 to 70 (allowable), D: < 50 (defective) | C | C | B | A | A | C |
| Wear/adhesion speed in in-molten steel rotation test (+) indicates adhesion, and (-) indicates wear Evaluation A (excellent): ≤ ± 5 μm/min, B (good): ≤ ± C (allowable): ≤ ± 30 μm/min, D (defective): > ± | C(+) | C(+) | B(+) | A(-) | A(+) | C(+) |

* mass% to be added to 100 mass% of the refractory raw material mixture

FIG. 13

TABLE 7

|  |  | Inventive Example 29 | Inventive Example 17 | Inventive Example 30 | Inventive Example 31 |
|---|---|---|---|---|---|
| Refractory raw material mixture (mass%) | | | | | |
| flaky graphite 500 μm or less | | 20 | 20 | 20 | 20 |
| fused alumina greater than 0.2 mm to 0.5 mm | | 40 | 40 | 40 | 40 |
| fused alumina greater than 0.1 mm to 0.2 mm | | 20 | 20 | 20 | 20 |
| fused alumina 0.1 mm or less | | 17 | 14 | 10 | 9 |
| zirconia fine powder | | 0 | 3 | 7 | 8 |
| fused MgO 0.5 to 0 mm | | | | | |
| silica fine powder 0.3 mm or less | | 3 | 3 | 3 | 3 |
| * Phenol resin (as fixed carbon) | | 3.8 | 3.8 | 3.8 | 3.8 |
| * Anhydrous boric acid powder (< 0.21 mm) | | | | | |
| * Calcium carbonate (< 0.21 mm) | | 10.9 | 10.9 | 10.9 | 10.9 |
| * Anhydrous borax powder (< 0.21 mm) | | 5.4 | 5.4 | 5.4 | 5.4 |
| * Anhydrous potassium carbonate (< 0.21 mm) | | | | | |
| * Anhydrous sodium carbonate (< 0.21 mm) | | | | | |
| * Anhydrous lithium carbonate (< 0.21 mm) | | | | | |
| Chemical component (mass%) | $Al_2O_3$ | 66.5 | 63.9 | 60.4 | 59.6 |
| | $SiO_2$ | 2.6 | 2.6 | 2.6 | 2.6 |
| | CaO | 5.3 | 5.3 | 5.3 | 5.3 |
| | $K_2O$ | | | | |
| | $Na_2O$ | 2.2 | 2.2 | 2.2 | 2.2 |
| | $Li_2O$ | | | | |
| | $B_2O_3$ | 2.5 | 2.5 | 2.5 | 2.5 |
| | $ZrO_2$ | | 2.5 | 6.0 | 6.8 |
| | MgO | | | | |
| | C (Free Carbon) | 20.4 | 20.4 | 20.5 | 20.5 |
| | others (impurities, etc.) | 0.5 | 0.6 | 0.5 | 0.5 |
| Total amount of ($CaO$, $B_2O_3$ and $R_2O$) R = Na, K, | | 10.0 | 10.0 | 10.0 | 10.0 |
| Mass ratio of CaO / ($B_2O_3 + R_2O$) | | 1.1 | 1.1 | 1.1 | 1.1 |
| Permeability of refractory material × $10^{-3}$ ($cm^2$ / cm $H_2O$) | | 0.50 | 0.52 | 0.52 | 0.54 |
| Thickness of slag-based covering layer on working surface of test sample after in-molten steel rotation test (mm) | | 0.75 | 0.76 | 0.81 | 0.85 |
| Coverage of slag-based covering layer with respect to working surface of test sample after in-molten steel A: > 90% (excellent), B: 71 to 90% (good), C: 50 to 70 (allowable), D: < 50 (defective) | | A | A | A | A |
| Wear/adhesion speed in in-molten steel rotation test (+) indicates adhesion, and (−) indicates wear Evaluation A (excellent): ≤ ± 5 μm/min, B (good): ≤ ± C (allowable): ≤ ± 30 μm/min, D (defective): > ± | | A(−) | A(+) | B(+) | C(+) |

* mass% to be added to 100 mass% of the refractory raw material mixture

FIG. 14

TABLE 8

| | Inventive Example 32 | Inventive Example 29 | Inventive Example 33 | Inventive Example 34 |
|---|---|---|---|---|
| Refractory raw material mixture (mass%) | | | | |
|     flaky graphite 500 μm or less | 20 | 20 | 20 | 20 |
|     fused alumina greater than 0.2 mm to 0.5 mm | 40 | 40 | 28.4 | 16.9 |
|     fused alumina greater than 0.1 mm to 0.2 mm | 20 | 20 | 20 | 20 |
|     fused alumina 0.1 mm or less | 20 | 17 | 20 | 20 |
|     zirconia fine powder | 0 | 0 | 0 | 0 |
|     fused MgO 0.5 to 0 mm | | | | |
|     silica fine powder 0.3 mm or less | 0 | 3 | 11.6 | 16.3 |
| * Phenol resin (as fixed carbon) | 3.8 | 3.8 | 3.8 | 3.8 |
| * Anhydrous boric acid powder (< 0.21 mm) | | | | |
| * Calcium carbonate (< 0.21 mm) | 10.9 | 10.9 | 10.9 | 10.9 |
| * Anhydrous borax powder (< 0.21 mm) | 5.4 | 5.4 | 5.4 | 5.4 |
| * Anhydrous potassium carbonate (< 0.21 mm) | | | | |
| * Anhydrous sodium carbonate (< 0.21 mm) | | | | |
| * Anhydrous lithium carbonate (< 0.21 mm) | | | | |
| Chemical component (mass%) $Al_2O_3$ | 69.1 | 66.5 | 59.1 | 52.2 |
| $SiO_2$ | 0.0 | 2.6 | 10.0 | 15.0 |
| $CaO$ | 5.3 | 5.3 | 5.3 | 5.3 |
| $K_2O$ | | | | |
| $Na_2O$ | 2.2 | 2.2 | 2.2 | 2.2 |
| $Li_2O$ | | | | |
| $B_2O_3$ | 2.5 | 2.5 | 2.5 | 2.5 |
| $ZrO_2$ | | | | |
| $MgO$ | | | | |
| C (Free Carbon) | 20.4 | 20.4 | 20.4 | 21.7 |
| others (impurities, etc.) | 0.5 | 0.5 | 0.5 | 1.1 |
| Total amount of ($CaO$, $B_2O_3$ and $R_2O$) R = Na, K, | 10.0 | 10.0 | 10.0 | 10.0 |
| Mass ratio of $CaO$ / ($B_2O_3$ + $R_2O$) | 1.1 | 1.1 | 1.1 | 1.1 |
| Permeability of refractory material × $10^{-3}$ ($cm^2$ / cm $H_2O$) | 0.45 | 0.50 | 0.65 | 0.80 |
| Thickness of slag-based covering layer on working surface of test sample after in-molten steel rotation test (mm) | 0.25 | 0.75 | 0.75 | 0.95 |
| Coverage of slag-based covering layer with respect to working surface of test sample after in-molten steel A: > 90% (excellent), B: 71 to 90% (good), C: 50 to 70 (allowable), D: < 50 (defective) | B | A | B | B |
| Wear/adhesion speed in in-molten steel rotation test (+) indicates adhesion, and (−) indicates wear Evaluation A (excellent): ≤ ± 5 μm/min, B (good): ≤ ± C (allowable): ≤ ± 30 μm/min, D (defective): > ± | B(−) | A(−) | B(−) | C(−) |

* mass% to be added to 100 mass% of the refractory raw material mixture

FIG. 15

REFRACTORY MATERIAL, CONTINUOUS CASTING NOZZLE USING THE REFRACTORY MATERIAL, PRODUCTION METHODS FOR THE CONTINUOUS CASTING NOZZLE, AND CONTINUOUS CASTING METHODS USING THE CONTINUOUS CASTING NOZZLE

TECHNICAL FIELD

The present invention relates to a refractory material capable of suppressing or preventing adhesion of inclusions from molten steel (the "suppressing or preventing" will hereinafter be referred to simply as "preventing"), a continuous casting nozzle using the refractory material, a production method for the continuous casting nozzle, and a continuous casting method using the continuous casting nozzle.

The continuous casting nozzle as a subject matter of the present invention encompasses all types of nozzles for use in continuous casting of molten steel. In particular, the present invention is directed to an immersion nozzle. While a typical type of continuous casting nozzle has a tubular refractory structure with an inner bore formed in an axial direction thereof to allow molten steel to pass therethrough, the present invention is also directed to any other type having a different configuration therefrom.

In the present invention, the term "axial direction" means a length or longitudinal direction of the continuous casting nozzle, and the term "tubular" means any configuration having an inner bore formed in the axial direction, irrespective of a cross-sectional shape in a direction perpendicular to the axial direction. In other words, the cross-sectional shape in the direction perpendicular to the axial direction is not limited to a circular shape, but it may be any other shape, such as an elliptical or oval shape, a rectangular or quadrangular shape, or a polygonal shape.

BACKGROUND ART

Late years, in connection with circumstances such as an increase in non-metallic inclusions (typically, $Al_2O_3$) in molten steel along with a trend toward a higher grade of steel, etc. (in the present invention, the terms "non-metallic inclusions", "$Al_2O_3$ inclusions" and "inclusions" are used as substantially synonymous terms), adhesion of inclusions as typified by $Al_2O_3$ onto a surface of an inner bore of a continuous casting nozzle, or clogging of the inner bore due to the inclusions, has been becoming one key factor determining a usable life of the continuous casting nozzle.

In the above circumstances, there has been an increasing need for enhancing durability of the continuous casting nozzle by preventing the adhesion of non-metallic inclusions onto the inner bore surface or the clogging of the inner bore due to the non-metallic inclusion. Therefore, with a view to preventing the adhesion of inclusion components (typically, $Al_2O_3$) from molten steel onto the inner bore surface, etc., various proposals have been made about a refractory layer on the side of the inner bore surface of the continuous casting nozzle.

For example, the following Patent Document 1 discloses a continuous casting nozzle in which at least an inner bore portion and/or a molten steel-contacting portion thereof comprises an $Al_2O_3$—$SiO_2$ based refractory material which contains no carbon component, and has a chemical composition comprising 5 to 10 weight % of $SiO_2$ and 90 to 95 weight % of $Al_2O_3$, wherein a dominant mineral phase of the refractory material consists of mullite, and corundum and/or $\beta$-$Al_2O_3$.

However, such a refractory material containing no carbon component has an extremely low resistance against thermal shock, and thereby involves a particularly high risk of breakage due to thermal shock occurring, for example, at the start of pouring of molten steel. Moreover, despite containing no carbon component, the above $Al_2O_3$—$SiO_2$ based refractory material is still incapable of sufficiently preventing the adhesion of inclusions as typified by $Al_2O_3$ or the clogging of the inner bore.

Therefore, many proposals have been made which are intended to incorporate a large amount of CaO component capable of reacting with inclusions as typified by $Al_2O_3$ to readily produce a low melting point substance, into a raw material for the refractory layer on the side of the inner bore surface, to prevent the adhesion of inclusions or the clogging of the inner bore.

For example, the following Patent Document 2 discloses a technique of arranging a lining layer along an inner bore of a continuous casting nozzle, wherein the lining layer has a composition comprising 40 to 90 weight % of CaO, 0 to 50 weight % of MgO and 0 to 20 weight % of C. However, particularly in cases where a large amount of CaO is contained in the lining layer, it is difficult to use the continuous casting nozzle in an actual continuous casting operation, because CaO exists as free-lime susceptible to hydration, and the hydration causes breakage or the like of the nozzle. Moreover, the composition comprising CaO has significantly large thermal expansibility, and a thermal expansion of the lining layer due to the composition causes breakage of a body layer i.e., a continuous casting nozzle body, on an outer side of the lining layer.

As measures for the problem related to CaO, for example, the following Patent Document 3 discloses a $ZrO_2$—CaO-containing continuous casting nozzle which comprises 16 to 35 weight % of CaO, 20 to 95 weight % of calcium zirconate-based clinker consisting primarily of $CaZrO_3$, and 5 to 50 weight % of graphite, and the following Patent Document 4 discloses a continuous casting nozzle in which an anti-adhesion layer is arranged as an inner bore surface layer (inner bore-side layer), wherein the anti-adhesion layer is made from a mixture added with one or two selected from the group consisting of: 40 to 85 weight % of zirconia clinker (containing Cubic $ZrO_2$ and $CaZrO_3$ as a mineral composition) containing 3 to 35 weight % of CaO; 10 to 30 weight % of graphite; 1 to 15 weight % of silica; and 1 to 15 weight % of magnesia. These materials are designed to allow CaO to exist as a mineral having a crystal structure with $ZrO_2$, etc., in order to prevent CaO from existing as free-lime.

However, the refractory materials comprising the above components has little effect in preventing the adhesion of inclusion components (typically, $Al_2O_3$) onto the inner bore surface, etc., in an actual continuous casting operation, and thereby it is impossible to ensure sufficient durability, such as sufficient durable hours (usable life), of the continuous casting nozzle. Moreover, although the problem of hydration can be solved, thermal expansibility of the inner bore-side layer cannot be reduced to a level equal to that of an $Al_2O_3$-graphite based refractory material for a conventional continuous casting nozzle body located on an outer side of the inner bore-side layer. Thus, for example, in a structure integrally provided with the two layers, it is impossible to sufficiently prevent breakage of the continuous casting nozzle due to thermal shock.

As a prerequisite to providing such a layer having large thermal expansibility on the side of the inner bore, it is necessary to increase thermal shock resistance in terms of a structure of the continuous casting nozzle. For example, the following Patent Document 5 discloses a casting nozzle in which a base material nozzle is formed on an outer side of a CaO nozzle made of a refractory material comprising 70 weight % or more of CaO and having an apparent porosity of 50% or less, and a gap corresponding to a thermal expansion amount of the CaO nozzle is provided between the CaO nozzle on the side of the inner bore and the base material nozzle on the outer side of the CaO nozzle.

However, as in the Patent Document 5, if a continuous casting nozzle is formed in a special structure having a gap provided between an inner bore-side layer and an outer periphery-side layer, it has a problem, such as difficulty in forming the two layers into a usual integral shaped body for use in a continuous casting operation. Moreover, it has another problem, such as an increase in risk of causing displacement or peeling of the inner bore-side layer, or damage or breakage of the continuous casting nozzle.

Further, the following cited Document 6 discloses a continuous casting nozzle for reducing adhesion of non-metallic inclusions onto the nozzle so as to prevent clogging of the nozzle, wherein the continuous casting nozzle is entirely or partly made of a refractory material having a composition comprising: 20 to 80 weight % of $Al_2O_3$; 10 to 45 weight % of graphite; 1 to 20 weight % of $SiO_2$; and 0.1 to less than 3 weight % of CaO or 0.1 to 5 weight % of oxide of a Group IIa element, except Ca, whereby the continuous casting nozzle can be produced at a low cost.

However, in the refractory material having the above composition, a low melting point substance based on a reaction between $Al_2O_3$, $SiO_2$ and CaO is simply produced in the entire refractory material containing these components. Specifically, although $SiO_2$ is volatilized to migrate, $Al_2O_3$ and CaO form $Al_2O_3$—CaO melt in a microstructure without migrating from their initial sites, and the $SiO_2$ component dispersed over the microstructure is absorbed in the melt to further accelerate the formation of a liquid phase, so that the melt is stabilized in the microstructure as CaO—$Al_2O_3$—$SiO_2$, which makes it difficult to form a film with a high coverage, on the side of a working surface. Moreover, after start of casting, the refractory components are supplied from $Al_2O_3$ and $SiO_2$ aggregates to the melt over time, so that an amount of low melting point substance to be produced is increased, which causes a problem in terms of high-temperature strength and corrosion resistance.

Consequently, in the above composition, a low melting point substance cannot be sufficiently produced between the working surface and $Al_2O_3$ inclusions in contact therewith, and thereby the effect of preventing the adhesion of $Al_2O_3$ inclusions inevitably becomes significantly limited. Thus, $Al_2O_3$ inclusions are likely to adhere onto the working surface over time, within a relatively short period of time. Moreover, Al in molten steel is oxidized by SiO (gas) released from the working surface, which is apt to accelerate formation and adhesion of $Al_2O_3$. For this reason, the $Al_2O_3$—$SiO_2$—CaO based material having the above composition has failed to become widely used as an adhesion-resistant material.

As above, a continuous casting nozzle having a CaO-based refractory material arranged on the side of an inner bore thereof often involves a difficult problem in terms of structure, production, handling, performance, etc., and there remain many unsolved industrial problems, such as the necessity of considerable labor and cost for overcoming the problem related to CaO.

PRIOR ART DOCUMENTS

Patent Documents

[Patent Document 1] JP 10-128507A
[Patent Document 2] JP 01-289549A
[Patent Document 3] JP 02-023494B
[Patent Document 4] JP 03-014540B
[Patent Document 5] JP 07-232249A
[Patent Document 6] JP 2001-179406A

SUMMARY OF THE INVENTION

Problem to be Solved by the Invention

It is an object of the present invention to preventing adhesion of $Al_2O_3$ inclusions onto an inside of a nozzle or clogging of the nozzle due to the $Al_2O_3$ inclusions, in a continuous casting operation for a steel grade which is likely to cause a nozzle clogging phenomenon, such as aluminum-killed steel. It is another object of the present invention to provide a refractory material capable of solving a problem, such as the occurrence of cracking due to high expansion inherent in CaO-containing refractory materials as proposed in the prior arts in order to prevent the adhesion of $Al_2O_3$ inclusions, etc., and further capable of being produced at a lower cost and in an easier manner than the conventional CaO-containing refractory materials, while allowing a nozzle having a more stable structure than a divided structure (e.g., a structure in which a nozzle body and an inner bore member are formed as separate parts) even during casting operation, to be obtained, a continuous casting nozzle using the refractory material, a production method for the continuous casting nozzle, and a continuous casting method using the continuous casting nozzle.

Means for Solving the Problem

A refractory material having a mass is provided in accordance with the disclosure, which contains: a CaO component in an amount of 0.5 mass % or more; one or both of $B_2O_3$ and $R_2O$ (R is one selected from the group consisting of Na, K and Li) in an amount of 0.5 mass % or more; $Al_2O_3$ in an amount of 50 mass % or more; and free carbon in an amount of 8.0 to 34.5 mass %, wherein a total amount of CaO, $B_2O_3$ and $R_2O$ is in the range of 1.0 to 15.0 mass %, and a mass ratio of $CaO/(B_2O_3+R_2O)$ is in the range of 0.1 to 3.0.

In an additional embodiment of the disclosure, the refractory material has a permeability of $0.4 \times 10^{-3}$ to $4.0 \times 10^{-3}$ $cm^2/(cm\ H_2O \cdot sec)$ as measured at room temperature after firing under a non-oxidizing atmosphere at 1000° C.

In an additional embodiment of the disclosure, the refractory material contains $ZrO_2$ in an amount of 6 mass % or less (including zero).

A continuous casting nozzle comprising the refractory material having a mass as provided in the disclosure arranged to define a part or an entirety of a molten steel-contacting surface thereof to be in contact with molten steel.

In an additional embodiment of the disclosure, the continuous casting nozzle has an integral structure where a first layer comprised of the refractory material arranged to define a part or an entirety of the molten steel-contacting surface is directly joined to a second layer comprised of a material other than the refractory material and located adjacent to the first layer.

A method of producing a continuous casting nozzle in which the refractory material is arranged to define a part or an entirety of a molten steel-contacting surface thereof to be in contact with molten steel, comprising the steps of: preparing a first mixture for use in forming a part or an entirety of a first layer comprised of the refractory material and located inside the continuous casting nozzle, and a second mixture for use in forming a second layer comprised of a material other than the refractory material and located adjacent to the first layer; and simultaneously compressing the first mixture and the second mixture in adjacent relation to each other to form the first and second mixtures into a shaped body having an integral structure.

A continuous casting method comprising using a continuous casting nozzle in which the refractory material is arranged to define a part or an entirety of a molten steel-contacting surface thereof to be in contact with molten steel, to prevent adhesion of inclusions including $Al_2O_3$ inclusions onto a wall surface of the continuous casting nozzle.

In the present invention, "R" in "$R_2O$" is one selected from the group consisting of Na, K and Li, as described above. Thus, "$R_2O$" is one selected from the group consisting of $Na_2O$, $K_2O$ and $Li_2O$. However, "$R_2O$" is not limited to one of $Na_2O$, $K_2O$ and $Li_2O$, but may be a combination of two or more of $Na_2O$, $K_2O$ and $Li_2O$. In cases where "$R_2O$" is a combination of two or more of $Na_2O$, $K_2O$ and $Li_2O$, they may be integrally handled.

In the present invention, a chemical component value is based on a measurement value of a sample after a heat treatment under a non-oxidizing atmosphere at 1000° C.

The present invention will be more specifically described below.

With respect to the above objects, the present invention is fundamentally directed to forming a dense and viscid film on a working surface of a refractory material to be in contact with molten steel, and continuously form and maintain the film to prevent adhesion of $Al_2O_3$ inclusions.

The term "dense and viscid film" means a covering layer including a molten slag layer. In the present invention, this covering layer on the surface of the refractory material will be also referred to as "semi-molten slag-based covering layer" or to simply as "slag-based covering layer".

In the present invention, it is important in a mechanism for removing $Al_2O_3$ inclusions that the semi-molten slag-based covering layer is a dense and viscid liquid phase.

The term "slag-based covering layer having a dense and viscid liquid phase" means that a slag phase, or a film-like layer existing on the working surface of the refractory material, i.e., between the refractory material and molten steel, includes a molten portion which allows the components such as CaO and $Al_2O_3$ to migrate therewithin, while maintaining a viscosity enough to keep the slag-based covering layer from being easily washed away by a molten steel stream. In the present invention, the term "slag phase" means a microstructure including a molten portion of the refractory material. This molten portion may include a glass phase, or may include a melt other than the glass phase. Further, it may be in a coexistence state where the glass phase or melt coexists, for example, with a crystal grain which does not constitute glass or is not in a molten state.

The refractory material of the present invention is a carbon-containing refractory material, wherein an inside of the refractory material is placed in a reducing atmosphere. CaO, and an oxide serving as a constituent of a low melting point substance and exhibiting higher volatility particularly under a reducing atmosphere, i.e., one or both of $B_2O_3$ and $R_2O$ are incorporated in the refractory material in a given amount to exist in a dispersed manner. These components are subjected to a reaction with a refractory aggregate consisting primarily of $Al_2O_3$ in the same level of temperature range as molten steel temperatures to form a viscid molten slag phase so as to form a slag-based covering layer on the surface of the refractory material to prevent the adhesion of $Al_2O_3$ and other inclusions.

The slag-based covering layer makes it possible to obtain a function/effect of preventing direct contact between $Al_2O_3$ inclusions and the surface of the refractory material and smooth irregularities in the surface of the refractory material so as to suppress microscopic turbulences in molten steel (molten steel turbulences) in a close vicinity to the surface of the refractory material. The suppression of molten steel turbulences in a close vicinity to the surface of the refractory material contributes to suppressing collision of non-metallic inclusions (typically, $Al_2O_3$) suspended in molten steel against the surface of the refractory material which would otherwise occur due to an inertia force of the molten steel turbulences. This makes it possible to suppress the adhesion of $Al_2O_3$ inclusions.

The dense and viscid slag-based covering layer on the working surface of the refractory material has a high coverage of the surface of the refractory material. Further, the covering layer itself has almost no open pore. Based on these advantages, the covering layer acts to suppress dissolution of the components (C, Si, etc.) of the refractory material into molten steel, so that it becomes possible to prevent the inclusion (typically, $Al_2O_3$) adhesion phenomenon. This is based on the following mechanism. When the refractory material comes into direct contact with molten steel and the components (C, Si, etc.) of the refractory material are dissolved into the molten steel, a gradient of surface tension of molten steel occurs in a region of the molten steel in a close vicinity to the surface of the refractory material due to a gradient of concentration of the dissolved substances (the surface tension becomes lower in a region of the molten steel adjacent to the refractory material). In this case, the $Al_2O_3$ adhesion phenomenon is promoted in the close vicinity to the surface of the refractory material, because inclusions (typically, $Al_2O_3$) in molten steel are apt to migrate toward a region of the molten steel having a lower surface tension.

The presence of the CaO based molten slag-based covering layer in a working interface of the refractory material with respect to molten steel also has an effect of inducing a desulfurization reaction for removing sulfur in molten steel by CaO, so that a surface tension of molten steel in the vicinity of the surface of the refractory material (refractory material/molten steel interface) is apt to increase along with a reduction in concentration of the dissolved sulfur, and thereby the $Al_2O_3$ adhesion is effectively suppressed.

As a prerequisite to forming the dense and viscid slag-based covering layer in the interface between the refractory material and molten steel, it is necessary to allow a slag-based covering layer to be reliably formed on the working surface (which is synonymous with the interface with molten steel) of the refractory material, while suppressing a reaction between a part of components of the refractory material constituting a slag phase (hereinafter referred to as "slag-forming components" on a case-by-case basis) and the remaining components of the refractory material other than the slag-forming components, in the microstructure of the refractory material.

The inventors checked an influence of the slag-forming components on the $Al_2O_3$ adhesion phenomenon under a molten steel flow by an after-mentioned in-molten steel rotation test. As a result, the inventors have obtained the following knowledge.

1. If a semi-molten slag-based covering layer is formed on a surface of a refractory material to have a coverage of 50% or more, and a thickness of 0.1 mm or more when the refractory material is subjected to the in-molten steel rotation test, the $Al_2O_3$ adhesion phenomenon can be significantly suppressed in continuous casting of steel.
2. A refractory material capable of obtaining a slag-based covering layer in the in-molten steel rotation test contains: a CaO component in an amount of 0.5 mass % or more; one or both of $B_2O_3$ and $R_2O$ (R is one selected from the group consisting of Na, K and Li) in an amount of 0.5 mass % or more; $Al_2O_3$ in an amount of 50 mass % or more; and free carbon in an amount of 8.0 to 34.5 mass %, wherein a total amount of CaO, $B_2O_3$ and $R_2O$ is in the range of 1.0 to 15.0 mass %, and a mass ratio of $CaO/(B_2O_3+R_2O)$ is in the range of 0.1 to 3.0.

In most of the conventional refractory materials, the inclusion (typically, $Al_2O_3$) adhesion-preventing effect will be deteriorated along with an elapsed of casting time. The reason is that each of compositions of the conventional refractory materials has a primary function of inducing a reaction with $Al_2O_3$ or formation of a low melting point substance only by a composition in a close vicinity to a surface thereof in contact with molten steel, and washing away the reaction product or the low melting point substance by a molten steel stream. In other words, it is because components (CaO, etc.) reacting with $Al_2O_3$ inclusions in molten steel in a vicinity of a surface of a refractory material are consumed over time, and a solid reaction product layer is formed on the surface, so that the reaction with $Al_2O_3$ inclusions in molten steel is significantly deteriorated or blocked after the formation of the solid phase. As a prerequisite to allowing the conventional refractory materials to obtain the $Al_2O_3$ adhesion-preventing effect stably or over a long period of time, it is necessary to add a reactive component (CaO, etc.) in a relatively large amount. However, in this case, a reaction with other coexisting refractory components such as $Al_2O_3$ aggregate causes a problem, such as deterioration in high-temperature strength, deterioration in thermal shock resistance, or deterioration in corrosion resistance.

The present invention makes it possible to maintain the $Al_2O_3$ inclusion adhesion-preventing effect over a long period of time, without spoiling the effect at the start of casting and within a short period of time after the start of casting and almost without deteriorating the effect. Specifically, the present invention has a feature that, based on a phenomenon that a volatile oxide ($B_2O_3$ and $R_2O$) is enriched (concentrated) in the interface between the working surface and molten steel under a reduction atmosphere in the same level of temperature range as molten steel temperatures, a reaction between the volatile oxide and an $Al_2O_3$ component as a primary aggregate is induced so as to continuously form a dense and viscid slag-based covering layer including a molten slag phase, in the interface between the refractory material and molten steel, to prevent a nozzle clogging phenomenon due to inclusions in steel.

This feature will be more specifically described below.

In a carbon-containing refractory material arranged in a region where molten steel passes therethrough at a high speed as in a continuous casting nozzle, a close vicinity to a surface (inner wall surface) of the refractory material in contact with molten steel during casting is substantially continuously exposed to a negative pressure. Under the condition that the $B_2O_3$ component and the $R_2O$ component each known as a component having volatility (gasifiability) higher than that of a $SiO_2$ component exist in a microstructure of the carbon-containing refractory material under the above environment, the volatile oxide quickly migrates toward the molten steel/ refractory material interface which is a negative pressure side. (Although the volatility of the $SiO_2$ component is lower than that of the $B_2O_3$ or $R_2O$ component, the $SiO_2$ component has an ability to facilitate film formation when it coexists with the $B_2O_3$ and/or $R_2O$ component. However, it is preferable to use the $SiO_2$ component in a grain size of 0.21 mm or more in order to suppress a reduction in melting point in the microstructure.) In this manner, as a result of the enrichment (concentration) of the volatile component in the molten steel/ refractory material interface, a molten slag phase is formed in the molten steel/refractory material interface.

The molten slag phase preferentially incorporates a CaO component as a basic component dispersed in a matrix, and the $B_2O_3$ component and the $R_2O$ component enriched in the working surface to continuously form a CaO rich CaO—$B_2O_3$ based or CaO—$R_2O$ based or CaO—$B_2O_3$—$R_2O$ based molten slag phase.

A part of the molten slag phase reacts with the $Al_2O_3$ aggregate in the working interface to continuously form a film-like layer including a dense and viscid molten slag phase, i.e., a slag-based covering layer, between molten steel and the refractory material.

The film-like slag-based covering layer, which is a slag phase including a molten phase formed on the working surface while maintaining an adequate viscosity at a temperature around a molten steel temperature, has a function of smoothing the working surface of the refractory material and a function similar to a protective film for the working surface, to allow particles of $Al_2O_3$ and other inclusions from molten steel to flow toward the molten steel without fixedly adhering onto the refractory material. Further, in the present invention, the migration and enrichment of the volatile component toward/in the working surface, and formation of the slag-based covering layer, continuously occur during casting (casting operation). Differently from the conventional art (the conventional refractory materials), the continuous formation of the slag-based covering layer and other phenomena allows the refractory material of the present invention to maintain the $Al_2O_3$ inclusion adhesion-preventing effect over a long period of time.

Each of the components and factors will be more specifically described below.

CaO has an effect of reacting with a sulfur component derived from molten steel, in the slag-based covering layer on the surface of the refractory material in contact with molten steel, to reduce a concentration of free sulfur in the molten steel, in the working interface. When the concentration of free sulfur in molten steel is reduced, the surface tension of the molten steel is apt to increase. Non-metallic inclusions (typically, $Al_2O_3$) migrate toward a region having a lower surface tension of molten steel, as mentioned above. Thus, based on the increase in surface tension of molten steel in a vicinity of the surface of the refractory material due to the change in sulfur concentration, a frequency of an event where non-metallic inclusions (typically, $Al_2O_3$) come into contact with the surface of the refractory material can be reduced. Further, CaO has a function of producing a low melting point substance through a reaction with $Al_2O_3$ to wash away adhered inclusions into molten steel. CaO is a component capable of reducing a viscosity of a slag phase. Particularly, CaO has a function of enhancing reactivity with respect to the $Al_2O_3$ aggregate at a molten metal temperature to serve as a means to forming a viscid slag phase. In view of these functions, it is necessary that CaO is contained in the refractory material in an amount of 0.5 mass % or more.

CaO is stable even under a reducing atmosphere. Thus, CaO is never volatilized and thereby free of migration toward the surface of the refractory material in contact with molten metal, through the microstructure of the refractory material as in the volatile component such as $B_2O_3$ or $R_2O$. However, in a semi-molten slag phase of the working surface, CaO can effectively suppress the $Al_2O_3$ adhesion. Specifically, when the slag phase is in a semi-molten state, CaO is allowed to migrate, so that it reacts with inclusions such as $Al_2O_3$ and S (sulfur), and contributes to enhancement in the reactivity. If the content of the CaO component is less than 0.5 mass %, the above functions cannot be obtained.

Each of $B_2O_3$ and $R_2O$ is a component constituting a slag phase (slag-forming components). Based on one or both of $B_2O_3$ and $R_2O$, a covering layer having a viscid semi-molten slag phase is formed in the working interface. This component is placed in a molten state at a lower temperature as compared with other components, so that it contributes to covering the surface of the refractory material just after the surface contacts molten steel. Even if it is attempted to form the slag phase using a refractory material which contains CaO in the above amount without containing the $B_2O_3$ and $R_2O$ components, it is difficult to maintain a film enough to suppress the adhesion of $Al_2O_3$ and other inclusions, in an initial stage of casting. Further, each of $B_2O_3$ and $R_2O$ has a vapor pressure fairly higher than that of a $SiO_2$ component even in the same level of temperature range as molten metal temperatures, so that they can be easily volatilized, particularly, under a reducing atmosphere, to facilitate migration through the microstructure of the refractory material.

In the working surface (hereinafter referred to also as "molten steel-contacting surface") of the refractory material, the semi-molten slag-based covering layer will be gradually vanished due to the reaction with $Al_2O_3$ and other inclusions from molten steel, and mechanical abrasion or the like caused by a molten steel stream. During casting (casting operation), the volatile $B_2O_3$ component and the volatile $R_2O$ component continuously migrate toward the working surface of the refractory material where the covering layer is being reduced.

The $B_2O_3$ component and the $R_2O$ component which have migrated on the side of the working surface of the refractory material are enriched in the working interface of the refractory material (with respect to molten steel: hereinafter referred to simply as "working interface"), and reacts with CaO in the microstructure to form a slag phase. The slag phase formed in the working surface acts to increase reactivity with respect to the surrounding refractory aggregates (primarily, $Al_2O_3$) so as to form a viscid and refractory slag layer.

As above, the $B_2O_3$ component and the $R_2O$ component play a role in allowing a film having a viscid slag phase to be continuously formed on the working surface of the refractory material, based on continuous migration toward the working surface of the refractory material according to volatilization.

On an assumption that CaO is contained in the aforementioned amount, an amount of one of or a total amount of both of $B_2O_3$ and $R_2O$ required for continuously forming the semi-molten slag-based covering layer during casting (casting operation) is 0.5 mass % or more. If the amount of one of or the total amount of both of $B_2O_3$ and $R_2O$ is less than 0.5 mass %, it is excessively small as a relative value with respect to other refractory aggregates, and thereby a slag phase as the semi-molten film layer is not formed. Moreover, it becomes difficult to achieve uniform dispersion and continuous migration of $B_2O_3$ and $R_2O$. Respective optimal amounts of CaO, $B_2O_3$ and $R_2O$ may be determined by the in-molten steel rotation test, depending conditions of individual casting operations.

From the reasons for the required amounts of the aforementioned components, an amount of CaO and one or both of $B_2O_3$ and $R_2O$ (a total amount of CaO and $B_2O_3$, or a total amount of CaO and $R_2O$, or a total amount of CaO, $B_2O_3$ and $R_2O$) is required to be 1.0 mass % or more, and an upper limit of the amount is required to be 15.0 mass % or less. If the amount of CaO and one or both of $B_2O_3$ and $R_2O$ is greater than 15.0 mass %, the formation of the molten slag phase in the microstructure of the refractory material in the same level of temperature range as molten steel temperatures is excessively accelerated, which is liable to cause problems, such as deterioration in refractoriness, an increase in wear, and deterioration in strength.

Further, in order to form a dense and viscid slag film layer on the working surface of the refractory material, in addition to the requirement that the amount of CaO and one or both of $B_2O_3$ and $R_2O$ is in the range of 1.0 to 15.0 mass %, a mass ratio of $CaO/(B_2O_3+R_2O)$ required to be in the range of 0.1 to 3.0.

In other words, the mass ratio relates to the components constituting the slag phase (slag-forming components) in the present invention, and means the nonvolatile component/the volatile component. In the present invention, it is an essential factor for forming and maintaining the viscid slag phase to continuously supply the volatile component to the working surface. For this purpose, it is effective to optimize a balance of the nonvolatile component/the volatile component, so as to ensure and enhance the effects of the present invention. If the mass ratio is less than 0.1, the CaO component stable under a reducing atmosphere is relatively reduced, and a chemical composition of a phase enriched in the working surface consists primarily of a volatile oxide, so that an obtained slag phase has a low viscosity, and thereby cannot stably exist under high temperatures. This makes it difficult to form a slag-based covering layer having a high coverage of the working surface, resulting in deterioration of the $Al_2O_3$ inclusion adhesion-suppressing effect. Otherwise, if the mass ratio is greater than 3.0, although the CaO component stable under a reducing atmosphere is relatively increased, a slag phase will be formed as a low-viscosity slag-based covering layer according to the enrichment, so that a slag phase to be easily washed away by a molten steel stream is increased to cause difficulty in continuously forming a slag-based covering layer over a long period of time. This results in deterioration of the $Al_2O_3$ inclusion adhesion-suppressing effect.

In view of continuously supplying $B_2O_3$ and $R_2O$ to the working surface of the refractory material to continuously and effectively form the dense and viscid slag phase or the semi-molten slag-based covering layer, it is preferable that the $B_2O_3$ component and the $R_2O$ component as a volatile component are dispersed in the matrix of the refractory material. In cases where the volatile component is contained in the matrix, volatilization of the oxide as the volatile component is facilitated, so that component migration in the microstructure becomes more likely to occur.

In the present invention, the term "matrix" means a part of the microstructure of the refractory material, which exists between refractory aggregates each having a grain size of greater than about 0.21 mm or more (the refractory aggregate will hereinafter be referred to as "coarse grain"), wherein the part of the microstructure comprises, as primary components, a carbon-based component consisting primarily of carbon as binder, and a refractory component having a grain size of about 0.21 mm or less, and wherein, if the microstructure includes a region where at least the volatile component and CaO are fused, or integrated or aggregated, irrespective of grain size (the region will hereinafter be referred to simply as "fused microstructure"), the fused microstructure is also encompassed in the matrix.

The state of being dispersed in the matrix means existing at approximately the same probability, irrespective of a position (at any position) in the matrix, i.e., existing approximately uniformly (a difference in content expressed in percentage is within about 30%) in the microstructure of the refractory material, except the coarse grains, instead of existing in the coarse grains, in the form of a compound or while being mechanically constrained.

As a prerequisite to allowing an inside of the refractory material to be placed in a reducing atmosphere, it is essential that free carbon is contained in the refractory material. In the present invention, the term "free carbon" means carbon existing as elemental carbon, irrespective of whether it is amorphous or crystalline, and irrespective of whether an impurity is incorporated in grains or a continuous microstructure, in the form of a non-compound, except a type existing as a compound with a non-carbon component. Specifically, the free carbon may include a binder derived from resin, pitch or the like, graphite and carbon black.

Differently from a refractory material consisting primarily of periclase or zirconate having high thermal expansibility and a large amount of CaO, the refractory material of the present invention comprises $Al_2O_3$ having relatively low expansibility as a primary constituent aggregate. Thus, thermal shock resistance can be ensured by incorporating graphite in an amount approximately equal to that in an $Al_2O_3$-graphite based refractory material for a nozzle body of a conventional continuous casting nozzle. However, particularly in cases where a refractory layer consisting primarily of CaO is arranged to define a working surface on the side of an inner bore of the nozzle in order to additionally obtain the inclusion (typically, $Al_2O_3$) adhesion-preventing effect, if it is attempted to increase thermal shock resistance only based on graphite to be contained in the refractory layer itself, an amount of graphite has to be excessively increased, and another negative effect, such as deterioration in corrosion resistance or abrasion resistance, will occur. Thus, such an approach is unrealistic. In the refractory material of the present invention, $Al_2O_3$ having relatively low thermal expansibility with respect to CaO is used as a primary component, so that an amount of graphite can be reduced as compared with the above approach.

Specifically, the refractory material of the present invention contains free carbon in an amount of 8.0 to 34.5 mass %. This free carbon means a sum of carbon as aggregate particles, and carbon as binder.

The carbon as aggregate particles consists primarily of a graphite-based aggregate, which is added as filler between carbon-based binder networks so as to improve thermal shock resistance based on its function of enhancing structural strength, increasing thermal conductivity and reducing thermal expansibility. The carbon-based aggregate particles (the carbon as binder can be regarded as a part of the carbon-based aggregate particles) exist between oxides or the like to effectively suppress sintering of the oxides and a reaction causing the formation of a low melting point substance. Further, it can also be expected to obtain quality stability during casting. Carbon black may be used as a part of the free carbon in combination with graphite.

The refractory material of the present invention may be used only to define an inner bore surface of a continuous casting nozzle. In this case, an amount of carbon as aggregate particles (e.g., graphite-based aggregate) is preferably 7 mass % or more. Alternatively, the refractory material of the present invention may be used to form a nozzle body of a continuous casting nozzle. In this case, an amount of carbon as aggregate particles is preferably in the range of 18 to 33.5 mass %. If the amount is less than 18.0 mass %, the nozzle is likely to have difficulty in ensuring sufficient resistance against thermal shock occurring when the nozzle receives molten steel under a condition that it has a relatively low temperature, e.g., a pre-heated temperature of about 1000° C. If the amount is greater than 33.5 mass %, the nozzle is liable to be damaged due to abrasion caused by a molten steel stream, so that a usable life of the continuous casting nozzle is shortened. Moreover, a local wear is liable to occur due to an uneven molten steel stream.

The carbon as binder bears strength of the refractory material itself, and acts to maintain a configuration as a structural body and primarily provide breakage resistance against thermal shock. Preferably, the carbon as binder is obtained primarily from a material, such as resin, pitch or tar, which has a large amount of fixed carbon and forms a carbon-bound body, at a high temperature (in a non-oxidizing atmosphere at about 1000° C. or more). Preferably, the carbon as binder is contained in an amount of 1.0 mass % or more. If the content is less than 1.0 mass %, it is difficult to obtain strength enough to maintain a structural body formed by binding aggregates together through carbon. Further, in cases where it is desirable to increase early strength of the refractory material of the present invention, for example, when it has a relatively small thickness (e.g., about 10 mm or less), the carbon as binder is preferably contained in an amount of 2.0 mass % or more. Preferably, an upper limit of the content is 5.0 mass % or less. If the content is greater than 5 mass %, thermal shock resistance or production yield of a product (continuous casting nozzle using the refractory material of the present invention) is likely to be undesirably deteriorated, although the carbon-bound structural body has sufficient strength. The amount of the carbon as binder may be determined within the above range, depending conditions of individual casting operations or conditions for producing a continuous casting nozzle.

In the present invention, a state of a specific slag-based covering layer measured by the in-molten steel rotation test is used as the basis for evaluation of the effect of the present invention. It is not realistic to directly measure a state of a slag-based covering layer in an actual casting operation and numerically express the state.

Therefore, in the present invention, an in-molten steel rotation test was employed as a laboratory verification method for estimating a state of a slag-based covering layer in an actual casting operation. It was also verified that the inclusion (typically, $Al_2O_3$) adhesion-preventing effect can be obtained in an actual casting operation if a slag-based covering layer having a coverage of 50% or more and a thickness of 0.1 mm or more is formed on a post-test surface of a refractory material as a test sample used in the test (it can be considered that the slag-based covering layer is in a semi-molten state at high temperatures).

The in-molten steel rotation test will be more specifically described below.

FIG. 1 shows a state after a holder 2 holding four target samples (hereinafter referred to as "test samples") 1 each formed in a given shape, in a lower portion thereof, is immersed in molten steel 3 in a crucible 4. Each of the four test samples 1 is formed in a rectangular parallelepiped shape, and the holder 2 is formed in a square pillar shape, wherein the test samples 1 are fixed to respective ones of four side surfaces of the lower portion of the holder 2. The test samples 1 are inserted into respective ones of four concaved portions provided in the square pillar-shaped holder 2 using mortar, in such a manner that they can be pulled out therefrom after completion of the test. An upper portion of the holder 2 is connected to and held by a rotary shaft (not shown) in a rotatable manner about a longitudinal axis thereof as a rotation axis. The holder 2 is made of a zirconia-carbon based refractory material and formed to have a square shape with a side of 40 mm, in horizontal cross-section perpendicular to the longitudinal axis thereof, and a longitudinal length of 160 mm. Each of the test samples 1 has a portion exposed from the holder 2, and the exposed portion has a heightwise dimension of 20 mm, a widthwise dimension of 20 mm and a lengthwise dimension of 25 mm. The test sample 1 is attached to the holder 2 in such a manner that a lower side surface 1a thereof is located above a bottom surface 2a of the holder 2 by 10 mm.

The crucible 4 is made of a refractory material and formed in a cylindrical shape having an inner diameter of 130 mm and a depth of 190 mm. The crucible 4 is placed in a high-frequency induction furnace 5 capable of controlling a molten state and a temperature of the molten steel 3. The holder 2 is immersed in the molten steel 3 at a depth of 50 mm or more. Although not illustrated, an upper surface of the crucible can be closed by a cover.

In the in-molten steel rotation test, after pre-heating the test samples 1 by holding it just above the molten steel 3 for 5 minutes, the test samples 1 are immersed in low-carbon aluminum-killed steel as the molten steel 3 to a depth of 50 to 100 mm from a top surface of the molten steel, and rotated at an average circumferential velocity of 1 m/sec in an outermost rotation position of each of the test samples 1. An oxygen concentration of the molten steel is kept within 50 ppm or less by adding aluminum to the molten steel, and the temperature of the molten steel is kept in the range of 1550 to 1570° C. After three hours, the test samples 1 are pulled up, and cooled together with the holder 2 in a non-oxidizing atmosphere to prevent oxidization. Then, dimensions of each of the test samples 1 are measured.

A measurement of an adhesion or wear speed is performed as follows. As shown in FIGS. 2(a) and 2(b), each of the test samples 1 after completion of the test is detached from the holder, and cut at a mid position of the height of the test sample along a horizontal plane (rotation plane) perpendicular to the rotation axis. Then, respective lengths at 6 positions of the cut surface set at 3 mm pitch in a direction from a lateral face (edge) 1b of the cut surface toward the rotation axis, are measured, and averaged. Respective lengths at the same positions of the test sample before the in-molten steel rotation test are also measured and averaged. Then, the average value (μm) after the in-molten steel rotation test is subtracted from the average value before the in-molten steel rotation test, and the obtained value is divided by a test time of 180 minutes, to obtain the adhesion or wear speed (μm/min).

The adhesion or wear speed (μm/minute) in the in-molten steel rotation test was evaluated on a scale of one to four. Specifically, the obtained values were classified, in terms of a wear/adhesion amount, into: (1) ±10 μm/min or less; (2) ±15 μm/min or less; (3) ±30 μm/min or less; and (4) greater than ±30 μm/min. As a result of a test in an actual casting operation using the materials different in the wear/adhesion amount, it was found that there is an allowable steel grade when the wear/adhesion amount is ±30 μm/min or less. Thus, the "±30 μm/min or less" was determined as a usable level. In this classification, the "+" indicates "adhesion", and the "−" indicates "wear".

Through the in-molten steel rotation test, it was found that a thickness of a slag-based covering layer on a surface of the test sample after the in-molten steel rotation test is required to be 0.1 mm or more, and a coverage of the slag-based covering layer on a molten steel-contacting surface of the test sample (percentage of an area of the molten steel-contacting surface of the test sample covered by a slag phase) is required to be 50% or more, as conditions for satisfying the wear/adhesion amount "±30 μm/min or less".

The thickness and the coverage of the slag-based covering layer formed on the surface of the test sample after the test (it can be considered that the slag-based covering layer is in a semi-molten state at high temperatures) was measured in the following manner.

The test sample having the cut surface after the test is impregnated and polymerized with a resin monomer, and polished to measure a thickness of a slag phase formed on a surface of the refractory material by a microscope. In the test sample after completion of the test as shown in FIGS. 2(a) and 2(b), a plurality of lines are drawn on a region subjected to contact with molten steel, at 3 mm pitch in a direction from the lateral face (edge) 1b toward the rotation axis (see FIG. 2(b)) to measure respective thickness of a slag-based covering layer around positions where each of the lines intersects a working surface of the refractory material, in a rotation direction (forward direction along the circumferential direction; in FIG. 2(b), a direction toward a side surface on an upper side) and in a direction opposite to the rotation direction (opposite or backward direction along the circumferential direction; in FIG. 2(b), a direction toward a side surface on a lower side). More specifically, the thickness of the slag-based covering layer may be measured in the following manner. A distance between a boundary of a healthy region and a surface of the slag-based covering layer is measured at a plurality of positions (if the refractory material includes an alumina aggregate subjected to a reaction with a slag layer, the distance is measured from a position where a shape of the aggregate is recognizable), and an average value of the measured distances is determined as the thickness of the slag-based covering layer.

The coverage C is measured and calculated in the following manner. A ratio of a length (L1) of the slag-based covering layer to a length (L0) of the working surface of the refractory material in an area located on the forward and backward sides in the rotation direction to extend from the lateral face (edge) 1b toward the rotation axis by 6 mm (in FIG. 2(b), an area from a right edge to the 2nd line on the right side) in a region subjected to contact with molten steel is calculated, and the coverage C (%) is derived by the following formula:

$$C\,(\%) = L1/L0 \times 100 \tag{1}$$

Further, the inventers found that, when a permeability of the refractory material falls within a specific range, an effect of continuously forming the slag-based covering layer can be stably obtained.

Specifically, as a prerequisite to allowing migration of the volatile oxide component at high temperatures to occur stably and efficiently, it is preferable to set better conditions for permeation of the volatile oxide, i.e., provide a void (pore) as a passage penetrating through the microstructure of the refractory material.

Furthermore, the inventers found that a permeability K of the refractory material as measured at room temperature after firing under a non-oxidizing atmosphere at 1000° C. is optimal as an index of the permeability.

The permeability K can be expressed as the following formula 2:

$$K = (Q \times L)/(S \times (P1-P2)) \tag{2}$$

, where: Q is a volume ($cm^3$) of air passing through a sample per unit time;
L is a thickness (cm) of the sample;
S is a cross-sectional area ($cm^2$) of the sample;
P1 is a pressure (cm $H_2O$) of air at a time when it flows into the sample; and
P2 is a pressure (cm $H_2O$) of air at a time when it flows out of the sample.

In the present invention, an optimal value of the permeability K of the refractory material as measured at room temperature after firing under a non-oxidizing atmosphere at 1000° C. is in the range of $0.4 \times 10^{-3}$ to $4.0 \times 10^{-3}$ $cm^2/(cm\,H_2O\cdot sec)$. If the permeability is less than $0.4 \times 10^{-3}$ cm$^2$/(cm H$_2$O·sec), the volatile component as a gasified slag-forming component hardly reaches the working surface, and the continuous or prolonged formation of the dense and viscid slag-based covering layer is likely to become insufficient. If the permeability is greater than $4.0 \times 10^{-3}$ cm$^2$/(cm H$_2$O·sec), the volatile component will be vanished within a short period of time after start of casting, which is likely to preclude a possibility to continuously form the slag-based covering layer during casting, resulting in the adhesion of Al$_2$O$_3$ (for example, under a condition that a flow rate of molten steel is high).

The above value of the permeability K was calculated by the above formula 2, based on a measurement result on air passing through the refractory material formed to have a diameter of about 30 to 60 mm and a thickness of about 5 to 30 mm. The sample may be cut out from the refractory material which has been already formed as a product, or may be preliminarily prepared for the measurement.

Means for obtaining the above specific permeability is not particularly limited. For example, the means may include the following techniques.

(1) A packing density is reduced in a shaping process of the refractory material.
(2) A particle size and a mixing rate of a refractory aggregate other than the volatile component are adjusted (avoiding a close-packed structure).
(3) A burnable liquid or a microscopic solid is mixed with a mixture for forming the refractory material, in advance of shaping, to form microscopic voids after firing.
(4) A shaping pressure is adjusted.

In the present invention, a content of Al$_2$O$_3$ in the refractory material is set to 50 mass % or more. A part of a molten slag phase formed in the working interface of the refractory material with respect to molten steel reacts with the refractory aggregate in the microstructure, so that properties, such as viscosity and refractoriness, of the slag-based covering layer, are determined The Al$_2$O$_3$ aggregate is most preferable as a refractory aggregate which is less likely to be washed away by a molten steel stream and capable of stably maintaining the dense and viscid slag-based covering layer.

Al$_2$O$_3$ is a neutral oxide, and capable of obtaining tenacious viscosity based on moderate reactivity with respect to a molten slag phase. Further, Al$_2$O$_3$ has excellent corrosion resistance against molten steel, and low thermal expansion as compared with an aggregate used in a conventional material for controlling Al$_2$O$_3$ adhesion, e.g., an aggregate consisting primarily of ZrO or MgO. A refractory material consisting primarily of Al$_2$O$_3$ is excellent in thermal shock resistance.

If the content of Al$_2$O$_3$ is less than 50 mass %, refractoriness of a slag-based covering layer formed through a reaction between the aggregate and the oxide enriched in the working interface becomes insufficient, and thereby the slag-based covering layer in the working interface of the refractory material is more likely to be washed away by a molten steel stream, so that it becomes difficult to maintain a dense slag-based covering layer.

As for a composition of the remainder, except the components as the requirement of the refractory material of the present invention, an oxide other than the aforementioned oxide, such as SiO$_2$, MgO, spinel or ZrO$_2$, may be used in combination. ZrO$_2$ acts to increase viscosity of a molten slag phase when it is incorporated in the molten slag phase. Thus, for example, in a situation where a temperature of molten steel is higher than usual, or a flow rate of molten steel is greater than usual, ZrO$_2$ contributes to suppressing the washing of a slag-based covering layer, so as to maintain the inclusion (typically, Al$_2$O$_3$) adhesion-preventing effect. However, for example, in a situation where the temperature of molten steel or the flow rate of molten steel is normal, the viscosity of the slag-based covering layer is excessively increased, so that the adhesion of Al$_2$O$_3$ and other inclusions is more likely to occur. Thus, generally, it is preferable that a content of ZrO$_2$ is limited to 6 mass % or less with respect to the entire refractory material.

Further, the remainder may be one or more selected from the group consisting of: carbides, such as SiC, TiC and B$_4$C; nitrides, such as Si$_3$N$_4$ and BN; and metals, such as Al, Si and Ti.

Preferably, a mineral phase of Al$_2$O$_3$ in the composition of the refractory material is a thermally stable corundum phase. The Al$_2$O$_3$ as a corundum is not early dissolved in the slag phase, so that the function as a structural body can be maintained to maintain an adequate usable life of a continuous casting nozzle. In addition, the Al$_2$O$_3$ can provide a thermal expansion characteristic equivalent to that of an Al$_2$O$_3$-graphite based material for a nozzle body of a conventional continuous casting nozzle. This also provides an advantage of making it easy to handle thermal shock resistance and wear resistance.

Preferably, the corundum-based Al$_2$O$_3$ has an Al$_2$O$_3$ purity of about 95 mass % or more. The corundum-based Al$_2$O$_3$ may be prepared by subjecting a synthetic raw material obtained by an electromelting process, a sintering process or the like, or a naturally-occurring raw material, to a heat treatment. In cases where a naturally-occurring raw material is used as a starting material, TiO$_2$ or SiO$_2$ is incorporated as a mineral phase of a compound, for example. An influence of such an impurity in raw material particles on the effect of the present invention is small.

The above impurity can contribute to improvement in adhesiveness with respect to the slag phase in corundum-based Al$_2$O$_3$ grain boundaries, as a grain size thereof becomes smaller, and, particularly, when the total amount of CaO, B$_2$O$_3$ and R$_2$O is small as in the range of the present invention. Thus, SiO$_2$ as the impurity derived from the corundum-based Al$_2$O$_3$ may be used, particularly, in a region having a grain size of about 0.21 mm or less, i.e., a region constituting the matrix, as a part of an entirety of a SiO$_2$ source for achieving the effect of the present invention.

With a view to improving thermal shock resistance, it is commonly implemented to allow fused SiO$_2$ to be contained in a refractory material in a coarse grain size (in the range of about 0.5 to 0.1 mm). In the present invention, such fused SiO$_2$ may be used in combination.

Although the SiO$_2$ component has low volatility under a reducing atmosphere in the same level of temperature as molten steel temperatures, as compared with the B$_2$O$_3$ component and the R$_2$O component, it has an ability to facilitate the film formation in the molten steel/refractory material interface when it is used in a coexisting manner. However, if the silica component coexists with the CaO component, it is stabilized as a slag phase in the microstructure, and hardly volatilized. Thus, preferably, the silica component is used in a grain size of 0.21 mm or more for the purpose of suppressing the formation of a low melting point substance.

The aforementioned refractory material of the present invention may be arranged to define a part or an entirety of a molten steel-contacting surface of a continuous casting nozzle so as to prevent the adhesion of Al$_2$O$_3$ and other inclusions, and the clogging of an inner bore of the nozzle. In other words, the refractory material may be arranged to primarily define a portion which would otherwise have the adhesion of Al$_2$O$_3$ and other inclusions in a large amount, depending on conditions of individual casting operations or a situation of the adhesion of $Al_2O_3$ and other inclusions. Further, a thickness of the refractory material of the present invention may be determined while taking into account a level of wear of the refractory material, a level of adhesion of $Al_2O_3$ and other inclusions, a required usable life, etc., depending on conditions of individual casting operations.

In a continuous casting nozzle where a layer comprised of the refractory material of the present invention is arranged on the side of an inner bore thereof, the refractory material of the present invention has a thermal expansion characteristic equivalent to that of an $Al_2O_3$-graphite based layer of a nozzle body of a conventional continuous casting nozzle. This eliminates a need for a particular structure, for example, a structure provided with a layer for stress relaxation, such as a mortar layer with a void and compressability, between a first layer comprised of the refractory material of the present invention (particularly, the inner bore-side layer of the continuous casting nozzle) and a second refractory layer adjacent to the first layer (particularly, a layer, such as an $Al_2O_3$-graphite based layer, which constitutes a nozzle body located on a radially outward side with respect to an axis of the continuous casting nozzle). In other words, a first layer comprised of the refractory material of the present invention can be directly joined to a second refractory layer adjacent to the first layer to form an integral structure.

In the above structure, the term "directly joined" means that respective surfaces of the first layer comprised of the refractory material of the present invention and the second refractory layer adjacent to the specific layer are in tight contact with each other without interposing a third layer, such as an bonding layer made of mortal or the like, or a space, therebetween. This tight contact state may include a state in which the first and second layers are engaged with each other through concave-convex surfaces thereof and apparently integrated together, and a state where the first and second layers are simply in contact with each other without engagement of concave-convex surfaces thereof.

A specific structure of a continuous casting nozzle may include the following types.

(1) A type in which a first layer comprised of the refractory material of the present invention is arranged to define a part or an entire of an inner bore and a part or an entire of a bottom of a continuous casting nozzle, and a second refractory layer is arranged on a radially outward side of the first layer with respect to an axis of the nozzle extending in a molten steel discharge direction.

(2) A type in which a first layer comprised of the refractory material of the present invention is arranged to define a part or an entire of an inner surface of an outlet port of a continuous casting nozzle, and a second refractory layer is arranged on a radially outward side of the outlet port with respect to an axis of the nozzle extending in a molten steel discharge direction.

(3) A type in which a first layer comprised of the refractory material of the present invention is arranged to define a part or an entire of an outer peripheral surface of a portion (including a bottom) of a continuous casting nozzle to be immersed in molten steel, and a second refractory layer is arranged on an inward side of the first layer (on the side of an inner bore of the nozzle).

In a method of producing the continuous casting nozzle having the above integral structure, the same production method as a conventional production method for a continuous casting nozzle may be employed. Specifically, the method comprises shaping a mixture by CIP (Cold Isostatic Press), and then subjecting an obtained shaped body to drying, firing, machining, etc. This is because the refractory material of the present invention contains approximately the same level of graphite as that of a graphite-containing refractory material for use in the conventional production method.

Thus, in a method of producing a continuous casting nozzle in which the refractory material of the present invention is arranged to define a part or an entirety of a molten steel-contacting surface thereof, a first mixture for use in forming a part or an entirety of a first layer comprised of the refractory material of the present invention, and a second mixture for use in forming a second layer comprised of a material other than the refractory material and located adjacent to the first layer, can be simultaneously filled in a mold and compressed by a CIP forming process. This makes it possible to form an integral structure in which the first and the second layer are engaged with each other through concave-convex surfaces thereof in a contact region therebetween to form an integral structure apparently without a joint and a separating layer therebetween.

Effect of the Invention

The refractory material of the present invention and the continuous casting nozzle provided with the refractory material can prevent the adhesion of $Al_2O_3$ and other inclusions on a molten steel-contacting surface of the nozzle, and the clogging of the nozzle due to the inclusions, during a continuous casting operation.

In addition, the inclusion (typically, $Al_2O_3$) adhesion or nozzle clogging-preventing function can be maintained continuously for a long period of time, as compared with a conventional refractory material and continuous casting nozzle comprising, particularly, $Al_2O_3$-graphite or calcium zirconate, as a basic constituent material.

The refractory material of the present invention and the continuous casting nozzle provided with the refractory material can solve problems, such as the occurrence of cracking, due to high expansion inherent in a conventional CaO-containing refractory material intended to prevent the adhesion of $Al_2O_3$ and other inclusions, etc. This is because thermal expansibility and a graphite amount in the refractory material of the present invention are approximately the same as those in an $Al_2O_3$-graphite based refractory material for a nozzle body or the like excellent in thermal shock resistance, and the refractory material of the present invention has a function of forming a glass phase or a slag phase in a microstructure thereof so as to relax internal stress thereof occurring at high temperatures based on the glass or slag phase.

Further, the refractory material of the present invention and the continuous casting nozzle provided with the refractory material can be produced a lower cost in an easier manner as compared with the conventional CaO-containing refractory material. This is because thermal expansibility and an amount of graphite excellent in stress relaxation, in the refractory material of the present invention, are approximately the same as those in an $Al_2O_3$-graphite based refractory material for a nozzle body or the like excellent in thermal shock resistance. Thus, even in a structure where the refractory material of the present invention is in direct contact with another refractory material for a nozzle body or the like excellent in thermal shock resistance, a stress (distortion) causing breakage will never occur therebetween.

Based on the integral structure with another refractory material for a nozzle body or the like excellent in thermal shock resistance, stability of the nozzle during a casting operation is improved as compared with a nozzle with a so-called divided structure.

The continuous casting nozzle of the present invention can be formed in an integral structure in the above manner. Thus, in a production process of the continuous casting nozzle, the same method as that for a conventional nozzle having an integral structure can be employed. This conventional production method is simple in production process and superior in raw material cost, as compared with a production method designed to prepare a plurality of parts separately and then join the parts together using mortar or the like. Thus, the continuous casting nozzle can be produced at a lower cost. In addition, a process time can also be shortened.

The conventional CaO-containing refractory material, particularly, containing CaO in a large amount, involves a serious problem due to a hydration reaction of CaO, such as breakage of the refractory material and a nozzle using the refractory material. In the refractory material of the present invention, a CaO source can be used in a form having low hydration (silicate, aluminate, etc.), so that the problem due to a hydration reaction of CaO, such as breakage of the refractory material and a nozzle using the refractory material, can be prevented. This makes it possible to facilitate handling, storage or the like of the refractory material of the present invention and the continuous casting nozzle provided with the refractory material, and eliminate a need for anti-hydration measures.

BRIEF DESCRIPTION OF THE DRAWINGS

FIG. 1 is an explanatory diagram showing a process of an in-molten steel rotation test.

FIGS. 2(a) and 2(b) is a conceptual diagram showing a horizontal cross-section of a test sample after the in-molten steel rotation test, wherein FIG. 2(a) shows a horizontal cross-section with adhesion, and FIG. 2(b) shows a horizontal cross-section with wear.

FIGS. 5(A) and 5(B) are sectional views showing a microstructure a test sample after the in-molten steel rotation test, around a working surface thereof, wherein FIG. 5(A) shows a microstructure of a conventional refractory material (comparative example 1 in Examples), and FIG. 5(B) shows a microstructure of the refractory material of the present invention (inventive example 17 in Examples).

FIGS. 7(A) and 7(B) are photographs showing a used cross-section of each continuous casting nozzle in Example I, wherein FIG. 7(A) is a photograph of a conventional continuous casting nozzle (immersion nozzle) (refractory material of the comparative example 1), and FIG. 7(B) is a photograph of a continuous casting nozzle (immersion nozzle) of the present invention (refractory material of the inventive example 17).

FIG. 8 is Table 1.
FIG. 9 is Table 2.
FIG. 10 is Table 3.
FIG. 11 is Table 4.
FIG. 12 is Table 5.
FIG. 13 is Table 6.
FIG. 14 is Table 7.
FIG. 15 is Table 8.

DESCRIPTION OF EMBODIMENTS

Figure 3:
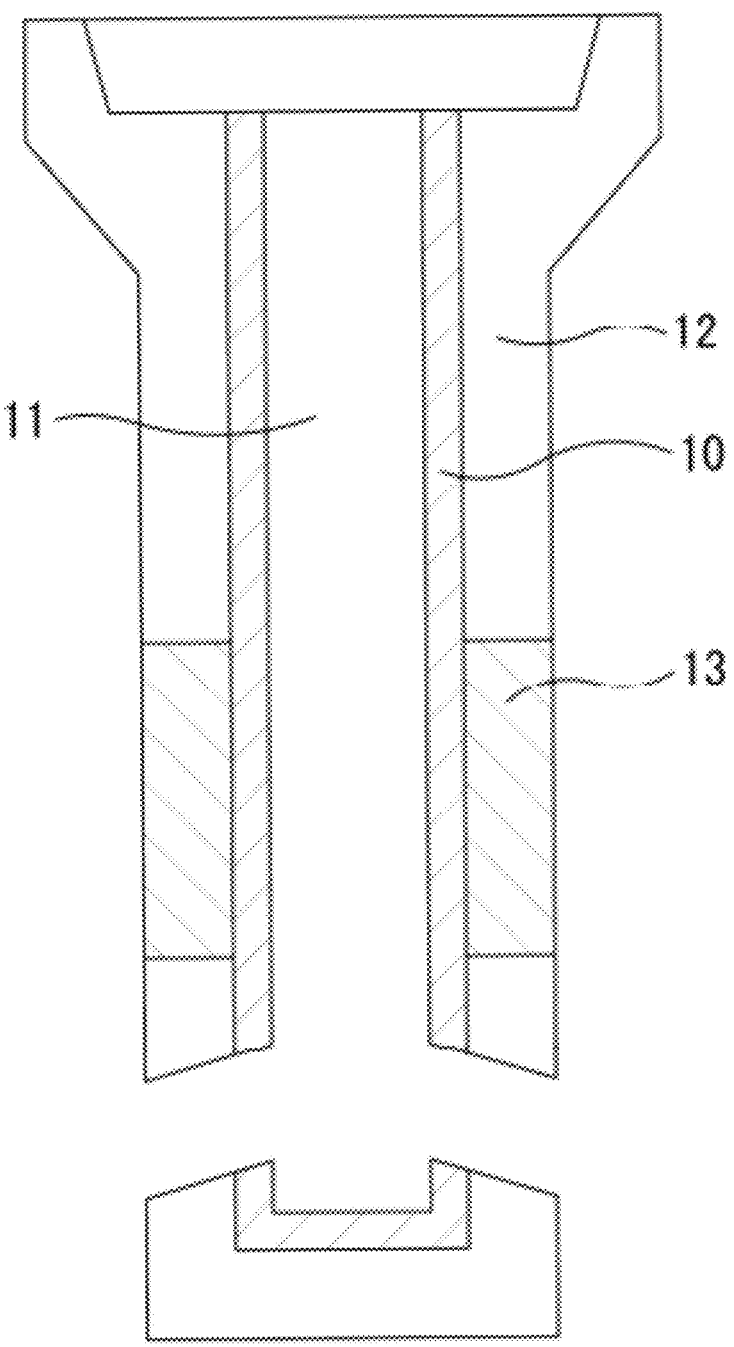
FIG. 3 is a sectional view showing one example of a continuous casting nozzle of the present invention (wherein a refractory material of the present invention is used to define only an inner bore surface).

A production method for a refractory material of the present invention will be described.

It is preferable to use boric acid as a raw material for $B_2O_3$, and use, as a raw material for $R_2O$, a high-purity reagent, such as an alkaline-earth oxide or an alkali metal oxide. Alternatively, a compound of $B_2O_3$, CaO and $R_2O$ may also be used. For example, an industrially distributed raw material, such as boric acid powder, borosilicate slag, industrial slag powder, frit powder, synthetic slag powder, Portland cement, $Al_2O_3$ cement, boron compound, borax powder, dolomite powder or various carbonates, may be used. Further, alkali silicate comprising a slag-forming base material component and a slag-forming assistant component may be used. In view of evenly forming slag, it is preferable to use a slag/frit fine powder prepared by pre-adjusting components and subjecting an obtained powder to melting/pulverization.

An adjustment for satisfying the following requirement: a total amount of CaO and one or both of $B_2O_3$ and $R_2O$ is in the range of 1.0 to 15.0 mass %, and a mass ratio of $CaO/(B_2O_3+R_2O)$ is in the range of 0.1 to 3.0, can be performed by adjusting the above raw materials while comparing them with a result of the in-molten steel rotation test.

The slag-forming effect can be enhanced by evenly dispersing the above slag-forming components in a microstructure of the refractory material. It is preferable to form a region having a grain size of about 0.21 mm or less, as a matrix.

In view of evenly dispersing the slag-forming components in the matrix between aggregates of the refractory material, and early forming a slag phase, it is preferable to add the slag-forming components in the form of a powder including 90.0 mass % or more of particles having a size of about 0.1 mm or less which is about 1/10 or less of a particle size of an aggregate, and disperse the slag-forming components (Generally, a maximum particle size of an aggregate for use in a refractory material for a continuous casting nozzle such as an immersion nozzle or a long nozzle is about 1 mm, in view of homogeneity of a microstructure, thermal shock resistance and corrosion resistance. In the present invention, an aggregate may have the same size.)

As carbon as aggregate particles, it is preferable to use a graphite-based aggregate having a developed hexagonal network, such as flaky graphite, earthy or amorphous graphite particle or synthetic graphite. Particularly in view of thermal shock resistance, it is most preferable to use naturally-occurring flaky graphite. Preferably, a content of carbon in the graphite-based aggregate is 90.0 mass % or more (including 100 mass %, except inevitable impurities). The reason is that, if a purity of graphite is less than 90.0 mass %, a problem, such as an increase in elastic modulus of the microstructure of the refractory material, occurs due to a sintering reaction between impurities or between an impurity and another raw material particle, which is likely to cause deterioration in thermal shock resistance.

The above graphite-based aggregate may be added as filler between carbon-based binder networks so as to improve thermal shock resistance based on its function of enhancing structural strength, increasing thermal conductivity and reducing thermal expansibility. Further, sintering of oxides and a reaction causing the formation of a low melting substance can be effectively suppressed to obtain quality stability during casting by allowing carbon including a binder to exist between the oxides and others in an evenly dispersed manner. It is preferable to use a graphite-based aggregate having a particle size of 2 mm or less to allow the carbon to exist in an evenly dispersed manner. However, if graphite-based aggregate having a particle size of less than 0.1 mm is primarily used, thermal shock resistance is deteriorated although homogeneity of the microstructure is improved. If the particle size is greater than 2 mm, an uneven distribution of components in the microstructure is likely to occur although thermal shock resistance is improved. Thus, the particle size of the graphite-based aggregate is preferably in the range of 0.1 to 2 mm. As the carbon as aggregate particles, various carbon blacks may be used in combination with graphite.

As for $Al_2O_3$ in the refractory material of the present invention, it is preferable that $Al_2O_3$ having a particle size of greater than 0.2 mm is contained in an amount of 70 mass % or more, preferably 90.0 mass % or more, with respect to the entire aggregate. The reason is that, in the region where a slag phase is to be formed, it is desirable to allow possible only the $Al_2O_3$ component to be evenly dispersed in the matrix of the refractory material, and to minimize a factor causing degradation in the microstructure, such as a phenomenon that particles as another aggregate for maintain a structure and strength of the refractory material are dissolved in the slag phase or react with a slag component to form a low melting point substance. A part of the $Al_2O_3$ aggregate may be substituted with a refractory aggregate which is less likely to react with raw materials for the slag-forming components, such as SiC, $ZrO_2$ or a zirconia compound, in the range of about 10 mass % or less with respect to the entire aggregate. However, the $ZrO_2$ component acts to excessively increase slag viscosity and accelerate the adhesion of $Al_2O_3$ and other inclusions, as mentioned above. Thus, it is preferable to limit an amount of the $ZrO_2$ component to 6 mass % or less with respect to the entire refractory material.

In the refractory material, the remainder, except the slag-forming components and the carbon, can include inevitable components derived from raw materials or incorporated during production, in addition to the $Al_2O_3$. Among the inevitable components, impurities such as $Fe_2O_3$ and $TiO_2$, are preferably limited to about 1.0 mass % or less. One reason is that the impurities are likely to locally lower viscosity of a semi-molten slag phase.

The above powders are mixed together to form a uniform powder mixture. Then, a binder, such as phenol resin, pitch or tar, as a carbon-based raw material assuming binder networks, appropriately selected and added to the powder mixture, and uniformly kneaded to obtain a shapable mixture. A raw material for the binder may be a powder form or may be a liquid form. It is important to adjust plasticity of the mixture in conformity to mixture characteristics suited to shaping.

The following description will be made about one example of a producing method for a continuous casting nozzle in which a refractory material obtained from a first mixture, as the refractory material of the present invention, is provided as an inner bore-side layer.
Separately from the first mixture for the refractory material of the present invention, a second mixture for an outer periphery-side layer, i.e., a nozzle body of the continuous casting nozzle, is prepared (the second mixture may be prepared in a conventional manner). Then, a plurality of separated spaces each having a given size are defined in a shaping die to form the inner bore-side layer and the outer periphery-side layer, and the separately-prepared first and the second mixtures are filled into respective ones of the spaces of the shaping die, and adjacent ones of the first and the second mixtures are brought into direct contact with each other, for example, by removing a partition plate for separating the spaces from each other.

The first and the second mixtures in direct contact with each other are simultaneously compressed by a CIP apparatus, and integrally formed into a given shape. An obtained shaped body is subjected to a heat treatment in a non-oxidizing atmosphere, or in an oxidizing atmosphere under a condition that a surface of the shaped body is subjected to an anti-oxidation treatment, at a temperature of 600 to 1300° C. The production method may include the step of, in advance of and independently of the step of performing the above heat treatment, subjecting the shaped body to a heat treatment at a temperature lower than the above temperature, for example, in order to remove volatile matter therefrom or cure resin therein. Finally, the heat-treated body is appropriately machined in the same manner as that in a conventional continuous-casting-nozzle production method.

A fundamental handling/operation in each of the steps, and a device or apparatus for use in each of the steps, may be the same as those in the conventional continuous-casting-nozzle production method.

In one embodiment of the present invention, the refractory material of the present invention is arranged as the inner bore-side layer to define only an inner bore surface of a continuous casting nozzle. Alternatively, the refractory material may be used for the remaining portion other than the inner bore-side layer, for example, a region to be in contact with molten steel, such as a bottom, an outlet port and an outer surface, or a nozzle body, or may be used for the entire continuous casting nozzle.

Further, the production method for the continuous casting nozzle using the refractory material of the present invention is not limited to the aforementioned production method designed to form the refractory material of the present invention as an inner bore-side layer integral with another material, but may comprise (1) forming the refractory material of the present invention into a tubular-shaped body; inserting the tubular-shaped body into an inner hole of a nozzle body prepared separately from the tubular-shaped body; and fixing the tubular-shaped body and the nozzle body together by mortar or the like, or (2) forming a nozzle body portion and an inner bore-side layer portion as a single piece using only the refractory material of the present invention.

EXAMPLES

An example (including a test example) of the present invention will be described below. In the test example, the formation of a slag-based covering layer and the adhesion of $Al_2O_3$ and other inclusions were evaluated by the in-molten steel rotation test.

Example A

Example A is an example of an evaluation test on influences of CaO, $B_2O_3$ and $R_2O$. Table 1 shows a group of related test samples, a composition of each of the test samples, and a test result.

TABLE 1 (Shown as FIG. 8)

As shown in inventive examples 1 to 10, when a CaO component is contained in an amount of 0.5 mass % or more, and one or both of $B_2O_3$ and $R_2O$ are contained in an amount of 0.5 mass % or more, a slag-based covering layer having a thickness of 0.1 mm or more and a coverage of 50% or more can be obtained on a working surface of each test sample. As for a speed of adhesion onto each test sample or a speed of wear of each test sample, each of the inventive examples 1 to 10 have an adhesion speed of +30 μm/min or less, i.e., can meet a criterion (for wear or adhesion speed) of ±30 μm/min or less.

In the inventive example 3, the inventive example 4 and the inventive example 5, a type of R in $R_2O$ is changed between Na, K and Li. Each of the inventive examples 3 to 5 can meet the criteria for thickness and coverage of the slag-based covering layer and the criterion for wear or adhesion speed. This shows that a difference in type of R (Na, K, Li) in $R_2O$ has no influence on the effect of the present invention.

Differently from the inventive examples, in comparative examples 1 to 5, although some of them has a slag-based covering layer with a thickness of greater than 0.1 mm, each of the comparative examples 1 to 5 fails to meet the criteria for coverage and wear or adhesion speed. Specifically, in each of the comparative examples, a slag-based covering layer for suppressing the adhesion of $Al_2O_3$ and other inclusions is not sufficiently formed.

Example B

Example B is an example of an evaluation test on an influence of a substitution of a part of an $Al_2O_3$ aggregate as a primary component of the refractory material, with MgO, based on a test sample in the inventive example 6. Table 2 shows a group of related test samples, a composition of each of the test samples, and a test result.

TABLE 2 (Shown as FIG. 9)

An inventive example 11, an inventive example 12 and the inventive example 6 each containing $Al_2O_3$ in an amount of 50 mass % or more can meet the criteria for thickness and coverage of the slag-based covering layer, and the criterion for wear or adhesion speed. However, a comparative example 6 containing $Al_2O_3$ in an amount of 47.4 mass % fails to meet the criteria for thickness and coverage of the slag-based covering layer, and the criterion for wear or adhesion speed.

Example C

Example C is an example of an evaluation test on an influence of a change in a carbon content, based on a test sample in the inventive example 6. Table 3 shows a group of related test samples, a composition of each of the test samples, and a test result.

TABLE 3 (Shown as FIG. 10)

An inventive example 13, the inventive example 6 and an inventive example 14 each containing carbon in an amount of 8.0 mass % or more can meet the criteria for thickness and coverage of the slag-based covering layer, and the criterion for wear or adhesion speed. However, a comparative example 7 containing carbon in an amount of 7.3 mass % which is less than 8 mass %, is slightly incapable of meeting the criteria for thickness and coverage of the slag-based covering layer, and fails the criterion for wear or adhesion speed. It is assumed that this is because a reducing atmosphere for volatilizing $B_2O_3$ and/or $R_2O$ is insufficient. Although a comparative example 8 containing carbon in an amount of greater than 34.5 mass % meets only the criterion for thickness of the slag-based covering layer, it fails to meet the criterion for coverage, and the wear speed is further increased, resulting in failing to meet the criterion for wear speed. It is assumed that this is because a region of a surface of the refractory material to be exposed to molten steel is increased due to insufficient formation of a viscid slag-based covering layer, to cause a phenomenon of carbon dissolution into molten steel.

Although the carbon content in the inventive example 13 is 8.2 mass %, it can be considered that the criteria can be fulfilled if the carbon content is 8.0 mass % or more, in view of a relative relationship with the result of the comparative example 7 which is slightly incapable of meeting the criteria (in the above carbon content range, a content of the slag-forming components is the same. Thus, it is considered that the thickness of the slag-based covering layer linearly changes according to the carbon content as a variable. Therefore, it can be assumed that the criteria are fulfilled if the carbon content is 8.0 mass % or more.)

Example D

Example D is an example of an evaluation test on an influence of a change in a total amount of CaO, $B_2O_3$ and $R_2O$. Table 4 shows a group of related test samples, a composition of each of the test samples, and a test result.

TABLE 4 (Shown as FIG. 11)

In Example D, the evaluation on the total amount of CaO, $B_2O_3$ and $R_2O$ was performed in the range of zero to 16 mass %, based on the test sample in the inventive example 6. As long as the total amount of CaO, $B_2O_3$ and $R_2O$ is in the range of 1.0 to 16.0 mass %, all of the inventive and comparative examples can meet the criteria for thickness and coverage of the slag-based covering layer, and the criterion for wear or adhesion speed. However, in the comparative example 9 where the total amount of CaO, $B_2O_3$ and $R_2O$ is 16.0 mass %, a wear tendency, and a tendency to have a relatively small thickness and a relatively low coverage, are observed. Particularly, although the coverage of the comparative example 9 is evaluated as "C", a region close to "D" was partially observed. These tendencies can be controlled to some extent by adjusting the component which reacts with a slag phase, such as an aggregate other than $Al_2O_3$ (e.g., $ZrO_2$). However, in view of stably maintaining the slag-based covering layer in a system consisting primarily of the $Al_2O_3$ aggregate, it is preferable that the total amount of CaO, $B_2O_3$ and $R_2O$ is 15 mass % or less. Thus, in the present invention, the total amount is set to be 15 mass % or less.

Based on the samples in Example D after the in-molten steel rotation test, a specific example of properties of the slag-based covering layer in the refractory material of the present invention and behaviors of the CaO component and the volatile component such as $B_2O_3$ and/or $R_2O$ in the refractory material of the present invention will be described below.

Figure 5:
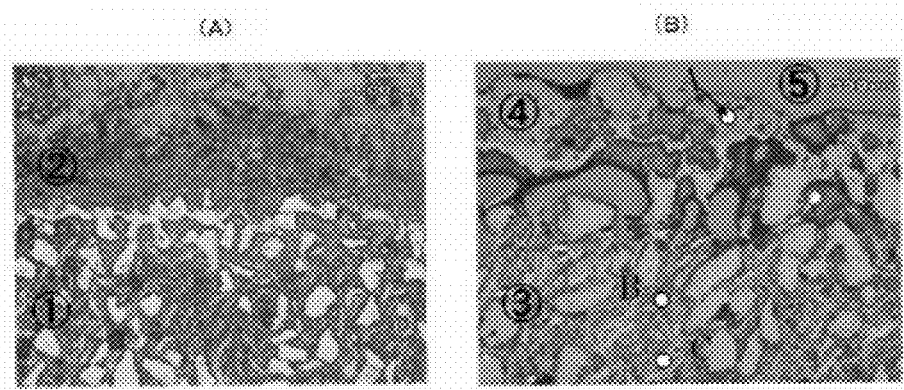

FIGS. 5(A) and 5(B) are sectional views showing a microstructure of a test sample after the in-molten steel rotation test, in a region from a vicinity of a working surface to a center of the test sample, wherein FIG. 5(A) shows a microstructure of a conventional refractory material (comparative example 1), and FIG. 5(B) shows a microstructure of the refractory material of the present invention (inventive example 17). In FIG. 5(A), the encircled number 1 ("encircled number n" will hereinafter be referred to as "encircled n") indicates a microstructure of a conventional $Al_2O_3$-graphite based refractory material, the encircled 2 indicates an adhesion layer on the working surface. In FIG. 5(B), the encircled 3 indicates a microstructure of the refractory material of the present invention. Further, the encircled 4 indicates a slag-based covering layer (viscid semi-molten slag phase at high temperatures), and the encircled 5 indicates a space (which means that there is no adhesion layer).

As seen in FIG. 5(B), the slag-based covering layer indicated by the encircled 4 has a concavo-convex shaped contact surface (encircled 5) with molten steel, and penetrates into voids (such as pores) of the refractory materials in an interface with the refractory material. This shows that the slag-based covering layer was a viscid semi-molten slag phase at high temperatures (A contact surface with molten steel becomes closer to a linear/flat and smooth surface as the viscosity becomes lower, and the slag-based covering layer becomes harder to penetrate into voids (such as pores) of the refractory materials in the interface with the refractory material as the viscosity becomes higher. However, the inventive example does not have such tendencies.)

Figure 6:
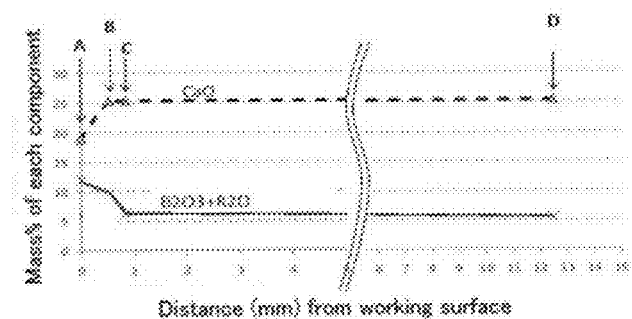
FIG. 6 is a graph showing components in an inside and a working surface of the refractory material of the present invention in FIGS(B) (a change in component ratio with respect to a distance from the working surface in a direction toward the inside of the refractory material).

FIG. 6 a graph showing components in an inside and the working surface of the refractory material of the present invention in FIG. 5(B) (a change in component ratio with respect to a distance from the working surface in a direction toward the inside of the refractory material). The positions A, B and C (the white circles) in FIG. 5(B) correspond to respective ones of the points A, B and C in FIG. 6.

The point D in FIG. 6 indicates components at a central position of the sample in FIG. 5(B). (The point D in FIG. 6 is located below a microscopic range illustrated in FIG. 5(B), and is thereby not shown in FIG. 5(B).)

A value of the component ratio at each of the points A, B, C and D was measured in a part of a matrix. In other words, the value of the component ratio at each of the points is not a ratio with respect to the entire refractory material. Thus, although it lacks a meaning as absolute value, a relative difference in each point can be checked therefrom.

As evidenced by FIG. 6, except an inside of the slag-based covering layer, an amount of the CaO component is approximately the same over the range from the working surface to the inside, and the amount of the volatile component ($B_2O_3$ and $R_2O$) is gradually increased in a direction toward the working surface, and particularly increased in a vicinity of the working surface.

In the inside of the slag-based covering layer, the amount of the volatile component ($B_2O_3$ and $R_2O$) is further increased, whereas the amount of CaO reduced.

The relative increase in the volatile component ($B_2O_3$ and $R_2O$) in the inside of the slag-based covering layer and on the side of the working surface shows that the volatile component is volatilized from the microstructure of the refractory material to migrate toward the working surface and into the slag-based covering layer. Further, the change in the amount of CaO shows that CaO is washed away by molten steel through a reaction with a molten steel-derived component ($Al_2O_3$, S, etc.).

Example E

Example E is an example of an evaluation test on an influence of a change in a mass ratio of $CaO/(B_2O_3+R_2O)$. Table 5 shows a group of related test samples, a composition of each of the test samples, and a test result.

TABLE 5 (Shown as FIG. 12)

In Example E, the evaluation on the mass ratio of $CaO/(B_2O_3+R_2O)$ was performed in the range of 0.1 to 3.2, based on the test sample in the inventive example 17. As a result, all of the inventive examples could meet the criteria for thickness and coverage of the slag-based covering layer and the criterion for wear or adhesion speed. However, along with a change in the mass ratio from the inventive example 23 containing a large amount of CaO to a comparative example 10, a wear tendency, a tendency to have a relatively small thickness and a relatively low coverage, are observed. Particularly, in the comparative example 10, although the coverage is evaluated as "C", a region close to "D" was partially observed. In view of stably maintaining the slag-based covering layer in the system consisting primarily of the $Al_2O_3$ aggregate, it is preferable that an upper limit of the mass ratio of $CaO/(B_2O_3+R_2O)$ is 3.0 mass % or less. Thus, in the present invention, the mass ratio is set to be 3.0 mass % or less.

Example F

Example F is an example of an evaluation test on an influence of a change in a permeability (as measured at room temperature after firing under a non-oxidizing atmosphere at 1000° C.). Table 6 shows a group of related test samples, a composition of each of the test samples, and a test result.

TABLE 6 (Shown as FIG. 13)

In Example F, the permeability is changed by changing a shaping pressure, based on the test sample in the inventive example 6. The permeability was measured and calculated in the aforementioned manner. As a result, all of the inventive examples could meet the criteria for thickness and coverage of the slag-based covering layer and the criterion for wear or adhesion speed. However, in the inventive example 28 where the permeability is $4.4 \times 10^{-3}$ $cm^2/(cm\ H_2O \cdot sec)$, a tendency to have a relatively small thickness of the slag-based covering layer and a relatively high adhesion speed is observed. In view of stably maintaining the slag-based covering layer in the system consisting primarily of the $Al_2O_3$ aggregate, it is preferable that the permeability K is $4.0 \times 10^{-3}$ $cm^2/(cm\ H_2O \cdot sec)$.

Example G

Example G is an example of an evaluation test on an influence of a change in a content of the $ZrO_2$ component. Table 7 shows a group of related test samples, a composition of each of the test samples, and a test result.

TABLE 7 (Shown as FIG. 14)

In Example G, the content of the $ZrO_2$ component was changed by substituting a $ZrO_2$ fine powder aggregate with an $Al_2O_3$ aggregate, based on the test sample in the inventive example 17. As a result, along with an increase in the content of the $ZrO_2$ component, all of the inventive examples could meet the criteria for thickness and coverage of the slag-based covering layer and the criterion for wear or adhesion speed, although a wear tendency was shifted to an adhesion tendency. However, as seen in Table 7, in the inventive example 31 where the content of the $ZrO_2$ component is 6.8 mass %, the adhesion tendency is increased, and a change in thickness of the adhesion layer with respect to a change in content of the $ZrO_2$ component (0.8 mass %) is larger, as compared with the inventive example 30 where the content of the $ZrO_2$ component is 6.0 mass %. In view of stably maintaining the slag-based covering layer in the system consisting primarily of the $Al_2O_3$ aggregate, it is preferable that the content of the $ZrO_2$ component is 6.0 mass % or less.

Example H

Example H is an example of an evaluation test on an influence of a change in a content of the $SiO_2$ component. Table 8 shows a group of related test samples, a composition of each of the test samples, and a test result.

TABLE 8 (Shown as FIG. 15)

In Example H, the content of the $SiO_2$ component was changed by substituting a $SiO_2$ fine powder aggregate with an $Al_2O_3$ aggregate, based on the test sample in the inventive example 32. As long as the content of the $SiO_2$ component is 15 mass % or less which is an evaluation range in Example H, all of the inventive examples could meet the criteria for thickness and coverage of the slag-based covering layer and the criterion for wear or adhesion speed. This shows that the content of the $SiO_2$ component has no influence on the effect of the present invention in the above range.

Example I

Example I is an example of a test in which the refractory material of the test sample in the inventive example 17 and the comparative example 1 are used in an actual operation of continuous casting of molten steel.

Figure 4:
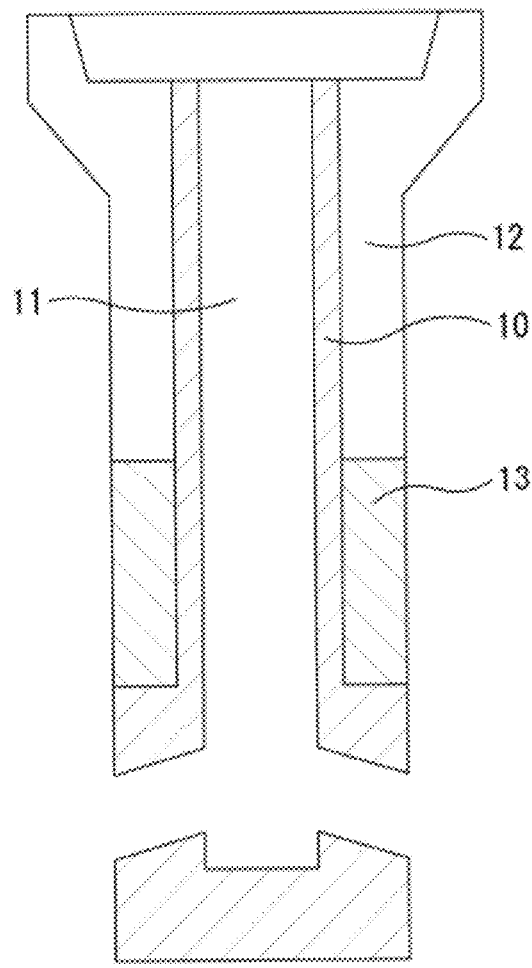
FIG. 4 is a sectional view showing another example of the continuous casting nozzle of the present invention (wherein the refractory material of the present invention is used to define the entire contact surface with molten steel).

The refractory material in the inventive example 17 was installed in an immersion nozzle illustrated in FIG. 4. Specifically, the refractory material of the present invention was arranged to define an entirety of a surface of the immersion nozzle to be in contact with molten steel, except a powder portion (see a region indicated by the reference numeral 10 in FIG. 10). A refractory material for a nozzle body (indicated by the reference numeral 12) was made of the refractory material in the comparative example 1, and the refractory material (10) of the present invention and the refractory material (12) for the nozzle body were simultaneously shaped to form an integral structure.

The refractory material in the comparative example 1 was installed in an immersion nozzle instead of the refractory material (10) of the present invention illustrated in FIG. 4, and integrally formed with the nozzle body (12) into a single piece. In other words, the refractory material in the comparative example 1 was arranged to define an entirety of a surface of the immersion nozzle to be in contact with molten steel, except a powder portion.

Figure 7:
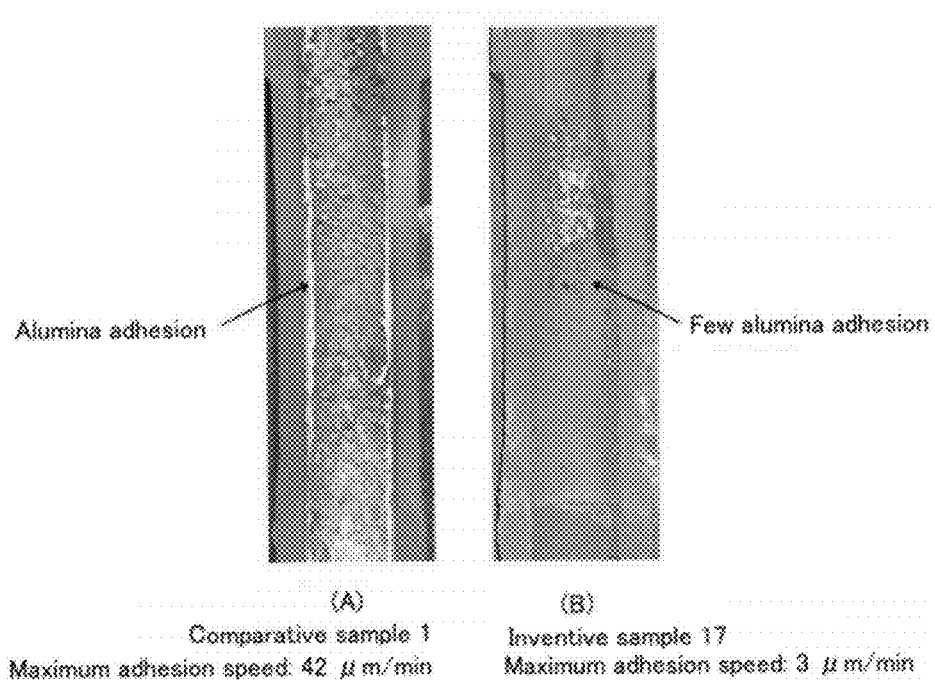

Each of the immersion nozzle using the inventive example (inventive immersion nozzle) and the immersion nozzle using the comparative example (comparative immersion nozzle) was used under usual casting conditions, such as pre-heating. Specifically, each of the inventive and comparative immersion nozzles was pre-heated by a gas burner, and then used in continuous casting of aluminum-killed carbon steel having a carbon concentration of 0.1 to 0.4%, under the following conditions: mold size=350×450 mm; and a casting speed=0.5 to 0.8 m/min. As a result, a maximum thickness of an adhesion ($Al_2O_3$, etc.) on the comparative immersion nozzle was 22 mm, and an adhesion speed was 42 μm/min (usage: 512 min, 10 c h), whereas the maximum thickness of an adhesion ($Al_2O_3$, etc.) on the inventive immersion nozzle used in concurrence with the comparative immersion nozzle was 1.5 mm, and the adhesion speed was 3 μm/min (usage: 512 min, 10 c h) (see FIG. 7). Further, damage, such as cracking, did not occur in the inventive immersion nozzle.

As evidenced by the above Examples, the continuous casting nozzle provided with the refractory material of the present invention can achieve the prevention of adhesion of $Al_2O_3$ and other inclusions, etc., and solve problems such as the occurrence of cracking, due to high expansion inherent in the conventionally-proposed CaO-containing refractory materials. In addition, the refractory material of the present invention can be produced at a lower cost and in an easier manner as compared with the conventional CaO-containing refractory materials to obtain a continuous casting nozzle having a more stable structure than a divided structure (e.g., a structure in which a nozzle body and an inner bore member are formed as separate parts) even during casting operation.

In the above Examples, the refractory material of the present invention is provided in an immersion nozzle with the structure illustrated in FIG. 4, in such a manner that it is arranged to define an entirety of a surface of the immersion nozzle to be in contact with molten steel, except a powder portion. Alternatively, the refractory material of the present invention may be provided in an immersion nozzle with the structure illustrated in FIG. 3, in such a manner that it is arranged to define only an inner bore surface (as indicated by the reference numeral 10).

EXPLANATION OF CODES

1: test sample
1a: lower side surface of test sample
1b: lateral face (edge) of test sample
2: holder
2a: bottom surface of holder
3: molten steel
4: crucible
5: high-frequency generator
10: refractory material of the present invention
11: inner bore of continuous casting nozzle
12: $Al_2O_3$-graphite refractory material
13: zirconia-graphite refractory material
Encircled 1: microstructure of conventional $Al_2O_3$-graphite refractory material
Encircled 2: adhesion layer of working surface indicated by the encircled 1
Encircled 3: microstructure of refractory material of the present invention
Encircled 4: slag-based covering layer (viscid semi-molten slag phase at high temperatures)
Encircled 5: space (which means that there is no adhesion layer)

The invention claimed is:

1. A refractory material having a mass which contains: a CaO component in an amount of 0.5 mass % or more; one or both of $B_2O_3$ and $R_2O$ (R is one selected from the group consisting of Na, K and Li) in an amount of 0.5 mass % or more; $Al_2O_3$ in an amount of 50 mass % or more; and free carbon in an amount of 8.0 to 34.5 mass %, wherein a total amount of CaO, $B_2O_3$ and $R_2O$ is in the range of 1.0 to 15.0 mass %, and a mass ratio of $CaO/(B_2O_3+R_2O)$ is in the range of 0.1 to 3.0.

2. The refractory material as defined in claim 1, which has a permeability of $0.4 \times 10^{-3}$ to $4.0 \times 10^{-3}$ cm$^2$/(cm H$_2$O·sec) as measured at room temperature after firing under a non-oxidizing atmosphere at 1000° C.

3. The refractory material as defined in claim 2, which contains $ZrO_2$ in an amount of 6 mass % or less (including zero).

4. The refractory material as defined in claim 1, which contains $ZrO_2$ in an amount of 6 mass % or less (including zero).

5. A continuous casting nozzle comprising a refractory material having a mass which contains: a CaO component in an amount of 0.5 mass % or more; one or both of $B_2O_3$ and $R_2O$ (R is one selected from the group consisting of Na, K and Li) in an amount of 0.5 mass % or more; $Al_2O_3$ in an amount of 50 mass % or more; and free carbon in an amount of 8.0 to 34.5 mass %, wherein a total amount of CaO, $B_2O_3$ and $R_2O$ is in the range of 1.0 to 15.0 mass %, and a mass ratio of $CaO/(B_2O_3+R_2O)$ is in the range of 0.1 to 3.0, wherein the refractory material is arranged to define a part or an entirety of a molten steel-contacting surface thereof to be in contact with molten steel.

6. The continuous casting nozzle as defined in claim 5, which has an integral structure where a first layer comprised of the refractory material arranged to define a part or an entirety of the molten steel-contacting surface is directly joined to a second layer comprised of a material other than the refractory material and located adjacent to the first layer.

7. The continuous casting nozzle according to claim 5, wherein the refractory material has a permeability of $0.4 \times 10^{-3}$ to $4.0 \times 10^{-3}$ $cm^2/(cm\ H_2O\cdot sec)$ as measured at room temperature after firing under a non-oxidizing atmosphere at 1000° C.

8. The continuous casting nozzle according to claim 7, wherein the refractory material contains $ZrO_2$ in an amount of 6 mass % or less (including zero).

9. The continuous casting nozzle according to claim 8, further comprising an integral structure where a first layer comprised of the refractory material arranged to define a part or an entirety of the molten steel-contacting surface is directly joined to a second layer comprised of a material other than the refractory material and located adjacent to the first layer.

10. The continuous casting nozzle according to claim 7, further comprising an integral structure where a first layer comprised of the refractory material arranged to define a part or an entirety of the molten steel-contacting surface is directly joined to a second layer comprised of a material other than the refractory material and located adjacent to the first layer.

11. The continuous casting nozzle according to claim 5, wherein the refractory material contains $ZrO_2$ in an amount of 6 mass % or less (including zero).

12. The continuous casting nozzle according to claim 11, further comprising an integral structure where a first layer comprised of the refractory material arranged to define a part or an entirety of the molten steel-contacting surface is directly joined to a second layer comprised of a material other than the refractory material and located adjacent to the first layer.

13. A method of producing the continuous casting nozzle of claim 5, in which the refractory material is arranged to define a part or an entirety of a molten steel-contacting surface thereof to be in contact with molten steel, comprising the steps of: preparing a first mixture for use in forming a part or an entirety of a first layer comprised of the refractory material and located inside the continuous casting nozzle, and a second mixture for use in forming a second layer comprised of a material other than the refractory material and located adjacent to the first layer; and simultaneously compressing the first mixture and the second mixture in adjacent relation to each other to form the first and the second mixtures into a shaped body having an integral structure.

14. The method according to claim 13, wherein the refractory material has a permeability of $0.4 \times 10^{-3}$ to $4.0 \times 10^{-3}$ $cm^2/(cm\ H_2O\cdot sec)$ as measured at room temperature after firing under a non-oxidizing atmosphere at 1000° C.

15. The method according to claim 14, wherein the refractory material contains $ZrO_2$ in an amount of 6 mass % or less (including zero).

16. The method according to claim 13, wherein the refractory material contains $ZrO_2$ in an amount of 6 mass % or less (including zero).

17. A continuous casting method comprising using the continuous casting nozzle according to claim 5 in which the refractory material is arranged to define a part or an entirety of a molten steel-contacting surface thereof to be in contact with molten steel, to prevent adhesion of inclusions including $Al_2O_3$ inclusions onto a wall surface of the continuous casting nozzle.

18. A continuous casting method comprising using the continuous casting nozzle of claim 7 in which the refractory material is arranged to define a part or an entirety of a molten steel-contacting surface thereof to be in contact with molten steel, to prevent adhesion of inclusions including $Al_2O_3$ inclusions onto a wall surface of the continuous casting nozzle.

19. A continuous casting method comprising using the continuous casting nozzle of claim 11 in which the refractory material is arranged to define a part or an entirety of a molten steel-contacting surface thereof to be in contact with molten steel, to prevent adhesion of inclusions including $Al_2O_3$ inclusions onto a wall surface of the continuous casting nozzle.

20. A continuous casting method comprising using the continuous casting nozzle of claim 8 in which the refractory material is arranged to define a part or an entirety of a molten steel-contacting surface thereof to be in contact with molten steel, to prevent adhesion of inclusions including $Al_2O_3$ inclusions onto a wall surface of the continuous casting nozzle.

* * * * *